US012674081B2

(12) United States Patent
Macfarlane et al.

(10) Patent No.: US 12,674,081 B2
(45) Date of Patent: Jul. 7, 2026

(54) COMPOSITIONS, ARTICLES, AND METHODS INVOLVING PRESSURE-SENSITIVE ADHESIVES COMPRISING POLYMER-GRAFTED PARTICLES

(71) Applicants:Massachusetts Institute of Technology, Cambridge, MA (US); tesa SE, Norderstedt (DE)

(72) Inventors: Robert J. Macfarlane, Cambridge, MA (US); Griffen Desroches, Cambridge, MA (US); Jacob Przyojski, Norderstedt (DE)

(73) Assignees: Massachusetts Institute of Technology, Cambridge, MA (US); tesa SE, Norderstedt (DE)

( * ) Notice: Subject to any disclaimer, the term of this patent is extended or adjusted under 35 U.S.C. 154(b) by 872 days.

(21) Appl. No.: 17/941,641

(22) Filed: Sep. 9, 2022

(65) Prior Publication Data

US 2023/0079151 A1       Mar. 16, 2023

Related U.S. Application Data

(60) Provisional application No. 63/308,888, filed on Feb. 10, 2022, provisional application No. 63/242,174, filed on Sep. 9, 2021.

(51) Int. Cl.
| | |
|---|---|
| *C09J 11/08* | (2006.01) |
| *B32B 7/12* | (2006.01) |
| *C09J 7/38* | (2018.01) |
| *C09J 11/04* | (2006.01) |
| *B32B 27/08* | (2006.01) |
| *B32B 27/36* | (2006.01) |

(52) U.S. Cl.
CPC ................ *C09J 11/08* (2013.01); *B32B 7/12* (2013.01); *C09J 7/385* (2018.01); *C09J 11/04* (2013.01); *B32B 27/08* (2013.01); *B32B 27/36* (2013.01); *B32B 2250/244* (2013.01); *B32B 2255/10* (2013.01); *B32B 2255/26* (2013.01); *C09J 2301/302* (2020.08); *C09J 2301/408* (2020.08); *C09J 2433/00* (2013.01); *C09J 2451/00* (2013.01)

(58) Field of Classification Search
CPC .... C09J 11/08; C09J 7/38; C09J 11/04; B32B 7/12
USPC ........................................................ 523/206
See application file for complete search history.

(56) References Cited

U.S. PATENT DOCUMENTS

2006/0257650 A1* 11/2006 Dollase ................ C09C 1/3063
                                                                       428/355 R
2023/0076513 A1      3/2023  Macfarlane et al.

FOREIGN PATENT DOCUMENTS

WO      WO 2011/133518 A1     10/2011
                                      A1

OTHER PUBLICATIONS

Desroches et al., Crosslinking of Pressure-Sensitive Adhesives with Polymer-Grafted Nanoparticles, Feb. 11, 2022, Applied Materials & Interfaces, pp. 9579-9586 (Year: 2022).*
Kubiak, Thesis Entitled: Polymer Grafted Nanoparticles as Functional and Mechanically Robust Single-Component Composites, Sep. 2021, pp. 1-204 (Year: 2021).*
Partial European Search Report for Application No. 22194927.4, mailed Mar. 1, 2023.
Extended European Search Report for Application No. 22194927.4, mailed Jun. 5, 2023.
Ahmadi-Dehnoei et al., Designing of desired nanocomposite pressure-sensitive adhesives through tailoring the structural characteristics of polysilsesquioxane-acrylic core-shell nanoparticles. International Journal of Adhesion and Adhesives. Dec. 2021; 111:102973. Epub Aug. 12, 2021.
Kim et al., Overcoming the trade-off relationship between mechanical and adhesive properties of acrylic pressure sensitive adhesive thin-film by reinforcing polydopamine-coated silica nanoparticles. Polymer. Jul. 16, 2021;228:123937. Epub Jun. 11, 2021.
Arrington et al., Reversibly Cross-linkable Bottlebrush Polymers as Pressure-Sensitive Adhesives. ACS Appl Mater Interfaces. Aug. 8, 2018;10(31):26662-26668. doi: 10.1021/acsami.8b08480. Epub Jul. 31, 2018.
Feldstein et al., Pressure sensitive adhesives based on interpolymer complexes. Prog Polymer Sci. 2015; 42: 79-153.
Jeusette et al., Microscopic morphology of blends between a new "all-acrylate" radial block copolymer and a rosin ester resin for pressure sensitive adhesives. Euro Polymer J. 2008; 44:3931-40.
Kiriakou et al., Incorporation of polymer-grafted cellulose nanocrystals into latex-based pressure-sensitive adhesives. ACS Mater Au. 2022; 2: 176-9.
Lee et al., Waterborne Core-shell pressure sensitive adhesive (PSA) based on polymeric nano-dispersant. J Adhes Interface. 2016; 17(3): 89-96.
Wang et al., Influence of phase separation on performance of graft acrylic pressure-sensitive adhesives with various copolyester side chains. ACS Omega. 2018; 3: 6945-54.
Yu et al., Functionalization of cellulose nanocrystals with γ-MPS and its effect on the adhesive behavior of acrylic pressure sensitive adhesives. Carbohydr Polym. Aug. 1, 2019;217:168-177. doi: 10.1016/j.carbpol.2019.04.049. Epub Apr. 13, 2019.

* cited by examiner

*Primary Examiner* — Deve V Hall

(74) *Attorney, Agent, or Firm* — Wolf, Greenfield & Sacks, P.C.

(57)       ABSTRACT

Compositions, articles, and methods involving pressure-sensitive adhesives comprising polymer-grafted particles are generally described.

16 Claims, 13 Drawing Sheets

114

112

108

106

104

110

102

306

402

403

404

405

406

COMPOSITIONS, ARTICLES, AND METHODS INVOLVING PRESSURE-SENSITIVE ADHESIVES COMPRISING POLYMER-GRAFTED PARTICLES

RELATED APPLICATIONS

The present application claims the benefit under 35 U.S.C. § 119(e) of U.S. Provisional Application Ser. No. 63/308,888, filed Feb. 10, 2022, entitled "COMPOSITIONS, ARTICLES, AND METHODS INVOLVING PRESSURE-SENSITIVE ADHESIVES COMPRISING POLYMER-GRAFTED PARTICLES," and U.S. Provisional Application Ser. No. 63/242,174, filed Sep. 9, 2021, entitled "COMPOSITIONS, ARTICLES, AND METHODS INVOLVING POLYMER GRAFTED PARTICLES WITH PRESSURE-SENSITIVE ADHESIVES," which are incorporated herein by reference in their entirety for all purposes.

TECHNICAL FIELD

Compositions, articles, and methods involving pressure-sensitive adhesives comprising polymer-grafted particles are generally described.

BACKGROUND

Adding filler materials to polymer matrices (e.g., plastics and rubbers) is a common approach for improving the mechanical properties and functionality of the material. $SiO_2$ nanoparticles, for example, may be used as an additive to add or augment specific traits of a polymer matrix, such as the thermal or electrical conductivity. Low aspect-ratio filler materials are typically incorporated into thermoplastic polymer matrices by mechanical or melt mixing, though solution blending and in-situ growth processes can also be used. Overcoming chemical incompatibility and ensuring a uniform distribution of filler particles is extremely difficult with these processing methods, however, and significant aggregation of filler occurs at even relatively low loading due to unfavorable polymer-filler interfacial interactions. The formation of these aggregates and agglomerates can ultimately lower the strength and toughness of the resulting composite, and the consequent inhomogeneity in filler distribution can interfere with filler functionality or other desirable properties like optical clarity.

SUMMARY

Compositions, articles, and methods involving pressure-sensitive adhesives comprising polymer-grafted particles are generally described. The subject matter of the present invention involves, in some cases, interrelated products, alternative solutions to a particular problem, and/or a plurality of different uses of one or more systems and/or articles. According to certain embodiments, a composition is described, the composition comprising a pressure-sensitive adhesive comprising polymer-grafted particles.

According to some embodiments, a composition is described, the composition comprising a pressure-sensitive adhesive comprising polymer-grafted particles, wherein the polymer-grafted particles are selected in conjunction with the pressure-sensitive adhesive such that the polymer-grafted particles are capable of interacting with at least one component of the pressure-sensitive adhesive, resulting in an increase in cohesive strength of the pressure-sensitive adhesive without a loss of adhesive strength as compared to an essentially identical composition that is otherwise equivalent but does not include the polymer-grafted particles under essentially identical conditions.

According to certain embodiments, a composition is described, the composition comprising a pressure-sensitive adhesive comprising one or more base polymer components and polymer-grafted particles comprising particles having one or more surfaces to which polymer chains are grafted, wherein the polymers chains are selected in conjunction with the one or more base polymer components to have a structure, length, weight, flexibility, and/or affinity for the one or more base polymer components so as to entangle with the one or more base polymer components and non-covalently crosslink with the one or more base polymer components such that the composition exhibits an increase in a cohesive strength of at least 10% and a decrease in adhesive strength of no more than 5% as compared to a cohesive strength and an adhesive strength of an essentially identical composition that is otherwise equivalent but does not include the particles grafted with polymers under essentially identical conditions.

According to some embodiments, a composition is described, the composition comprising a pressure-sensitive adhesive comprising one or more base polymer components and particles, wherein the particles are provided in an amount and with a substantial uniformity of distribution such that the composition exhibits an increase in a cohesive strength of at least 10% and a decrease in adhesive strength of no more than 5% as compared to a cohesive strength and an adhesive strength of an essentially identical composition that is otherwise equivalent but does not include the particles under essentially identical conditions, wherein the substantial uniformity of distribution of the particles within the pressure-sensitive adhesive is such that the amount of particles does not vary by more than 50% in any given first arbitrary sub-section of the pressure-sensitive as compared to any given second arbitrary sub-section of the pressure-sensitive adhesive that is different than the first arbitrary sub-section, wherein the first and second arbitrary sub-sections each comprise at least 10% of a cross-section of the pressure-sensitive adhesive taken across any axis of the pressure-sensitive adhesive.

According to some embodiments, an article is described, the article comprising one or more substrates, and a pressure-sensitive adhesive associated with the one or more substrates, wherein the pressure-sensitive adhesive comprises polymer-grafted particles, wherein the polymer-grafted particles are selected in conjunction with the pressure-sensitive adhesive such that the polymer-grafted particles are capable of interacting with at least one component of the pressure-sensitive adhesive, resulting in an increase in cohesive strength of the pressure-sensitive adhesive without a loss of adhesive strength as compared to an essentially identical composition that is otherwise equivalent but does not include the polymer-grafted particles under essentially identical conditions.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
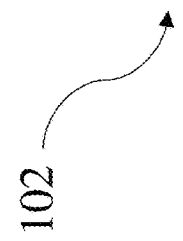
FIG. 1 shows, according to some embodiments, a schematic diagram of a polymer-grafted particle.

Pressure-sensitive adhesives (PSAs) are a ubiquitous class of material commonly containing elastomeric polymers that can adhere to a substrate under light pressure and with no chemical change to the adhesive itself. The soft, viscoelastic nature of PSAs allows them to flow into and permeate the surface microfeatures of a given substrate, providing a very large interface through which van der Waals forces act to hold the material in place. Furthermore, as the adhesion process typically does not require any curing or drying steps, PSAs can often be removed from substrates without damaging them or leaving undesirable residues.

Because PSAs rely on non-covalent interactions, however, they are often only useful to a certain service life and maximum load. Both prolonged static load and repeated loading-unloading cycles will cause conventional PSA films to lose cohesive strength, resulting in degradation and eventual destruction of the adhesive films. Furthermore, PSAs are maximally useful only between the glass transition ($T_g$) and melting ($T_m$) points of the elastomer itself, as temperatures below $T_g$ can render the material too brittle, and temperatures above $T_m$ can cause the material to flow and lose adhesion. Covalent crosslinking of the PSA base elastomer (such as with acrylic acid moieties and/or metal salts) has proven effective at increasing the cohesive strength and extending the functional temperature window of the adhesive film, but at the cost of adhesive power.

The addition of nanoscale filler materials (e.g., $SiO_2$ nanoparticles) can improve substrate adhesion and/or film cohesion at low filler content (typically less than 5 weight percent (wt. %)), but at higher filler content where appreciable advantages might be realized, there is typically a significant loss in performance in one aspect of the PSA (e.g., cohesion may be slightly improved, but with unacceptable loss in adhesion).

The Inventors have realized and appreciated that polymer-grafted particles are promising candidates for property enhancement of polymer matrices. In some embodiments, for example, crosslinkable polymer-grafted particles may be used as functional composite fillers for pressure-sensitive adhesive films. Elastomer chains that are capable of interacting with one or more components of the PSA are grafted to particles, thereby resulting in polymer-grafted particles that provide multiple beneficial advancements over bare nanoparticle fillers. The particle may act as a central "node" for the polymer chains grafted to its surface such that the polymer chains are capable of binding (e.g., non-covalently binding) and/or entangling with one or more components of the PSA. That is, in one aspect, an additive comprising the polymer-grafted particles is combined with a PSA, wherein the polymer-grafted particles comprise polymer chains that are capable of interacting with the PSA base polymer. The particle-grafted polymer chains, for example, may non-covalently interact and/or otherwise become entangled with the PSA base polymer. In certain embodiments, the particle-grafted polymer chains may non-covalently crosslink with a crosslinking agent that crosslinks with the PSA base polymer.

The composition of the particle and/or polymer chains may be chosen to ensure compatibility (e.g., miscibility) of the polymer matrix and filler. In certain embodiments, the miscibility of the particle-grafted particles with the polymer matrix results in a substantially uniform distribution of the polymer-grafted particles throughout the volume of the polymer matrix due to steric repulsion between the polymer chains. A substantially uniform distribution of the polymer-grafted particles throughout the volume of the polymer matrix advantageously avoids particle aggregation and ensures that the overall material is viscoelastic enough to maintain good adhesion.

The polymer-grafted particles can significantly improve the cohesive strength of a pressure-sensitive adhesive film at advantageously low particle concentrations (e.g., less than or equal to 5 wt. %) without adversely affecting material processability. Moreover, at these low loadings, the number of particles at the adhesive-substrate interface remains low and therefore does not affect the adhesive strength of the material. The resulting pressure-sensitive adhesive films comprising polymer-grafted particles have significantly improved mechanical properties, such as longer average active adhesion times prior to failure under a static load.

According to certain embodiments, a composition is described herein, the composition comprising a pressure-sensitive adhesive comprising polymer-grafted particles. As used herein, the term "polymer-grafted particle" is given its ordinary meaning in the art and generally refers to a particle having at least one surface to which one or more polymer chains are tethered.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

According to certain embodiments, the polymer-grafted particle comprises a particle. FIG. 1 shows, according to some embodiments, a schematic diagram of a polymer-grafted particle. Referring to FIG. 1, polymer-grafted particle 102 comprises particle 104.

The particle may have any of a variety of suitable shapes. In some embodiments, for example, and as shown in FIG. 1, the particle may be substantially spherical. Although a spherical shape is shown in the figures, other shapes are also possible, as the disclosure is not meant to be limiting in this regard. In certain embodiments, for example, the particle may have a tubular, conical, or two-dimensional shape.

The particle may have any of a variety of suitable sizes. In certain embodiments, for example, the particle is a microparticle. As used herein, the term "microparticle" is given its ordinary meaning in the art and generally refers to a particle having a maximum characteristic dimension (e.g., a maximum diameter) between greater than or equal to 1 micrometer and less than 1000 micrometers. In other embodiments, the particle is a nanoparticle. As used herein, the term "nanoparticle" is given its ordinary meaning in the art and generally refers to a particle having a maximum characteristic dimension (e.g., a maximum diameter) between greater than or equal to 1 nanometer and less than 1 micrometer.

Referring to FIG. 1, particle 104 may have average maximum dimension 110 (e.g., average maximum diameter). According to certain embodiments, the particle has an average maximum dimension greater than or equal to 5 nm, greater than or equal to 10 nm, greater than or equal to 25 nm, greater than or equal to 50 nm, greater than or equal to 100 nm, greater than or equal to 500 nm, greater than or equal to 1 micrometer, or greater than or equal to 5 micrometers. In some embodiments, the particle has an average maximum dimension less than or equal to 10 micrometers, less than or equal to 5 micrometers, less than or equal to 1 micrometer, less than or equal to 500 nm, less than or equal to 100 nm, less than or equal to 50 nm, less than or equal to 25 nm, or less than or equal to 10 nm. Combinations of the above recited ranges are possible (e.g., the particle has an average maximum dimension between greater than or equal to 5 nm and less than or equal to 10 micrometers, the particle has an average maximum dimension between greater than or equal to 100 nm and less than or equal to 500 nanometers). Other ranges are also possible. In certain embodiments, the average maximum dimension of the particle may be determined by scanning electron microscopy (SEM), transmission electron microscopy (TEM), dynamic light scattering (DLS), and/or optical microscopy.

The particle may comprise any of a variety of suitable materials. According to some embodiments, for example, the particle comprises an oxide, a metal, a polymer, a semiconductor, a carbon-based material, and/or a metal-organic framework (MOF). The particle may, in some embodiments, comprise silicon dioxide ($SiO_2$), aluminum oxide ($Al_2O_3$), titanium dioxide ($TiO_2$), germanium dioxide ($GeO_2$), iron oxide, zinc oxide, lanthanum oxide, gold (Au), palladium (Pd), copper (Cu), iron (Fe), platinum (Pt), silver (Ag), poly(methyl methacrylate), polystyrene, a nitride (e.g., silicon nitride, boron nitride), cadmium sulfide (CdS), cadmium selenide (CdSe), cadmium telluride (CdTe), lead sulfide (PbS), a carbon nanostructure (e.g., a carbon nanoparticle, nanotube, nanowire, nanosheet, etc.), and/or a zeolitic imidazole framework. Other materials are also possible.

As explained in further detail herein, the particle material may be chosen, in some embodiments, such that the resulting polymer-grafted particle is miscible with a polymer matrix (e.g., a pressure-sensitive adhesive) in which the polymer-grafted particle is to be added. A person of ordinary skill in the art would be capable of selecting polymer-grafted particles (and/or components thereof) that are miscible with the polymer matrix based on a variety of factors including, but not limited to, the physical and/or chemical characteristics (e.g., chemical structure) of the particles and/or polymer chains, the size (e.g., average maximum dimension, average molecular weight) of the particles and/or polymer chains, and/or the physical and/or chemical characteristics (e.g., chemical structure) of one or more components of the pressure-sensitive adhesive (e.g., one or more base polymers). Those of ordinary skill in the art would understand how to select particles, polymer chains to be grafted to the particles, and base polymers of a pressure sensitive adhesive to achieve miscibility. In certain embodiments, a polymer-grafted particle that is miscible with a polymer matrix in which the polymer-grafted particle is to be added may advantageously provide an increase in one or more desirable mechanical properties of the polymer matrix (e.g., a cohesive strength) as compared to an essentially identical composition that is otherwise equivalent but does not include the polymer-grafted particles. For example, in certain embodiments, the polymer chains are selected such that they have an affinity for the one or more base polymers such that the polymer chains non-covalently interact and/or entangle with the one or more base polymers. The polymer chains may be selected, in some embodiments, such that the polymer-grafted particles are substantially uniformly distributed throughout the volume of the pressure-sensitive adhesive (e.g., due to steric repulsion of the polymer chains), thereby avoiding particle aggregation and promoting viscoelasticity of the pressure-sensitive adhesive.

Methods of preparing the particles would be known to a person of ordinary skill in the art. In certain embodiments, for example, the Stoller method may be used to synthesize the particles (e.g., $SiO_2$ particles). In other embodiments, the particles may be purchased commercially.

The polymer-grafted particles may comprise the particle in any of a variety of suitable amounts. In certain embodiments, for example, the polymer-grafted particle comprises the particle in an amount greater than or equal to 10 wt. %, greater than or equal to 20 wt. %, greater than or equal to 30 wt. %, greater than or equal to 40 wt. %, greater than or equal to 50 wt. %, greater than or equal to 60 wt. %, greater than or equal to 70 wt. %, or greater than or equal to 80 wt. %, based on the total weight of the polymer-grafted particle. In some embodiments, the polymer-grafted particle comprises the particle in an amount less than or equal to 90 wt. %, less than or equal to 80 wt. %, less than or equal to 70 wt. %, less than or equal to 60 wt. %, less than or equal to 50 wt. %, less than or equal to 40 wt. %, less than or equal to 30 wt. %, or less than or equal to 20 wt. % based on the total weight of the polymer-grafted particle. Combinations of the above recited ranges are possible (e.g., the polymer-grafted particle comprises the particle in an amount between greater than or equal to 10 wt. % and less than or equal to 90 wt. % based on the total weight of the polymer-grafted particle, the polymer-grafted particle comprises the particle in an amount between greater than or equal to 40 wt. % and less than or equal to 60 wt. % based on the total weight of the polymer-grafted particle). Other ranges are also possible. Methods of determining the amount (e.g., wt. %) of the particle in the polymer-grafted particle include, but are not limited to, thermogravimetric analysis (TGA), ultraviolet-visible (UV-vis) spectroscopy, infrared (IR) spectroscopy, and/or TEM.

In certain embodiments, the particle has one or more surfaces to which polymer chains are grafted. Referring, for example, to FIG. 1, particle 104 has surface 106 to which polymer chains 108 are grafted. As used herein, the term "grafted" is given its ordinary meaning in the art and generally refers to the addition of polymer chains onto a surface of a particle. In certain embodiments, the polymer chains may be chemically bound to the surface of the particle. In some embodiments, for example, the polymer chains may be covalently bound and/or non-covalently bound (e.g., ionically bound) to the surface of the particle. The polymer chains may have any of a variety of suitable lengths. Referring, for example, to FIG. 1, polymer chain 108 may have maximum length 112 that is measured from surface 106 of particle 104 to terminal end 114 of polymer chain 108. The length of the polymer chain may advantageously promote a substantially uniform distribution of the polymer-grafted particles throughout the volume of the pressure-sensitive adhesive (e.g., due to steric repulsion of the polymer chains). In certain embodiments, the length of the polymer chain may ensure flexibility of the polymer chain, thereby enabling entanglement of the polymer chain with one or more components of the pressure-sensitive adhesive (e.g., one or more base polymer components, as explained herein in greater detail).

According to certain embodiments, the polymer chains may have an average maximum length greater than or equal to 50 Å, greater than or equal to 100 Å, greater than or equal to 200 Å, greater than or equal to 300 Å, greater than or equal to 400 Å, greater than or equal to 500 Å, greater than or equal to 1000 Å, greater than or equal to 2000 Å, greater than or equal to 3000 Å, or greater than or equal to 4000 Å. In some embodiments, the polymer chains have an average maximum length less than or equal to 5000 Å, less than or equal to 4000 Å, less than or equal to 3000 Å, less than or equal to 2000 Å, less than or equal to 1000 Å, less than or equal to 500 Å, less than or equal to 400 Å, less than or equal to 300 Å, less than or equal to 200 Å, or less than or equal to 100 Å. Combinations of the above recited ranges are possible (e.g., the polymer chains have an average maximum length between greater than or equal to 50 Å and less than or equal to 5000 Å, the polymer chains have an average maximum length between greater than or equal to 500 Å and less than or equal to 1000 Å). Other ranges are also possible. Methods of determining the length of the polymer chains include, but are not limited to, SEM, TEM, gel permeation chromatography (GPC), viscometry, DLS, and/or small-angle X-ray scattering (SAXS).

The polymer chain may have any of a variety of suitable number average molecular weights ($M_n$). In certain embodiments, for example, the polymer chain has a number average molecular weight greater than or equal to 20,000 g/mol, greater than or equal to 40,000 g/mol, greater than or equal to 60,000 g/mol, greater than or equal to 80,000 g/mol, greater than or equal to 100,000 g/mol, greater than or equal to 120,000 g/mol, greater than or equal to 140,000 g/mol, greater than or equal to 160,000 g/mol, or greater than or equal to 180,000 g/mol. In some embodiments, the polymer chain has a number average molecular weight less than or equal to 200,000 g/mol, less than or equal to 180,000 g/mol, less than or equal to 160,000 g/mol, less than or equal to 140,000 g/mol, less than or equal to 120,000 g/mol, less than or equal to 100,000 g/mol, less than or equal to 80,000 g/mol, less than or equal to 60,000 g/mol, or less than or equal to 40,000 g/mol. Combinations of the above recited ranges are possible (e.g., the polymer chain has a number average molecular weight between greater than or equal to 20,000 g/mol and less than or equal to 200,000 g/mol, the polymer chain has a number average molecular weight between greater than or equal to 100,000 g/mol and less than or equal to 120,000 g/mol). Other ranges are also possible. In certain embodiments, the number average molecular weight of the polymer chain may be determined by GPC, matrix-assisted laser desorption/ionization-time of flight (MALDI-TOF) mass spectrometry, and/or viscometry.

The polymer-grafted particle may comprise any of a variety of suitable numbers of polymer chains per particle. In some embodiments, for example, the polymer-grafted particle comprises greater than or equal to 50, greater than or equal to 100, greater than or equal to 500, greater than or equal to 1,000, greater than or equal to 5,000, greater than or equal to 10,000, greater than or equal to 50,000, greater than or equal to 100,000, greater than or equal to 150,000, greater than or equal to 200,000, greater than or equal to 250,000, greater than or equal to 300,000, or greater than or equal to 400,000 polymer chains per particle. In certain embodiments, the polymer-grafted particle comprises less than or equal to 500,000, less than or equal to 400,000, less than or equal to 300,000, less than or equal to 250,000, less than or equal to 200,000, less than or equal to 150,000, less than or equal to 100,000, less than or equal to 50,000, less than or equal to 10,000, less than or equal to 5,000, less than or equal to 1,000, less than or equal to 500, or less than or equal to 100 polymer chains per particle. Combinations of the above recited ranges are possible (e.g., the polymer-grafted particle comprises between greater than or equal to 50 and less than or equal to 500,000 polymer chains per particle, the polymer-grafted particle comprises between greater than or equal to 50,000 and less than or equal to 100,000 polymer chains per particle). Other ranges are also possible. The number of polymer chains per particle may be determined, in some embodiments, by TGA, GPC, TEM, and/or SEM.

The polymer chain may comprise any of a variety of suitable polymers. In certain embodiments, the polymer chain may comprise a copolymer (e.g., a polymer made by reaction of two different monomers). As explained in further detail herein, the polymer chain may comprise one or more functional groups that are capable of interacting with one or more components (e.g., base polymer components, cross-linking agents) of a polymer matrix (e.g., a pressure-sensitive adhesive). According to some embodiments, for example, suitable functional groups include, but are not limited to, an ester, an acrylate, and/or a methacrylate. In certain non-limiting embodiments, for example, the polymer chain comprises poly(n-butyl acrylate-co-acrylic acid).

As explained in further detail herein, one or more polymers of the polymer chains may be chosen, in some embodiments, such that the resulting polymer-grafted particle is miscible with a polymer matrix (e.g., a pressure-sensitive adhesive) in which the polymer-grafted particle is to be added. A person of ordinary skill in the art would be capable of selecting polymer chains that are miscible with the polymer matrix based on a variety of factors including, but not limited to, the structure, length, and/or molecular weight of the polymer chains. In certain embodiments, a polymer-grafted particle that is miscible with a polymer matrix in which the polymer-grafted particle is to be added may advantageously provide an increase in one or more desirable mechanical properties of the polymer matrix (e.g., a cohesive strength) as compared to an essentially identical composition that is otherwise equivalent but does not include the polymer-grafted particles.

Figure 2:
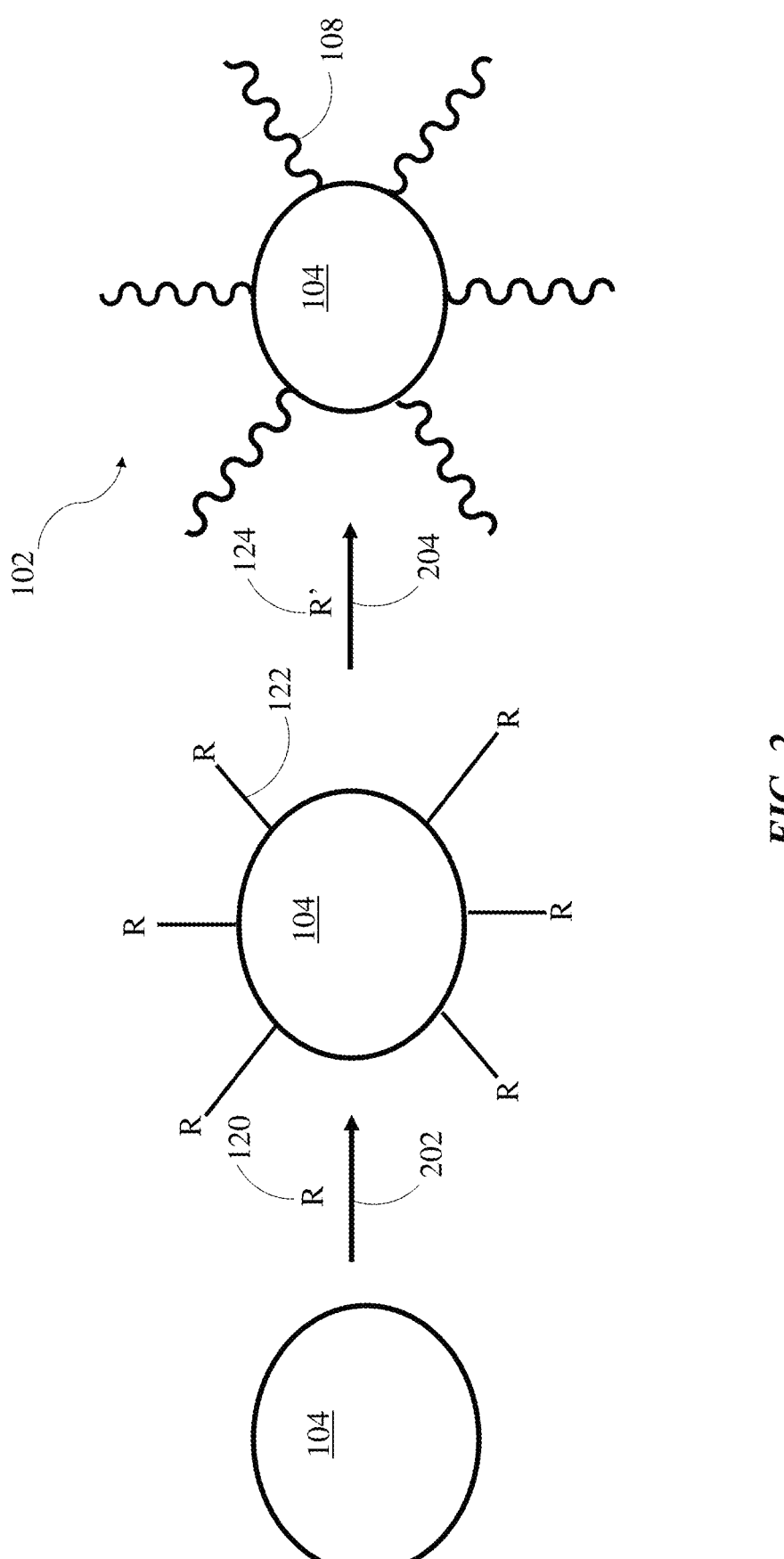
FIG. 2 shows, according to some embodiments, a schematic diagram of the synthesis of a polymer-grafted particle.

The polymer chains may be prepared by any of a variety of suitable means. FIG. 2 shows, according to some embodiments, a schematic diagram of the synthesis of a polymer-grafted particle. Referring to FIG. 2, particle 104 may be provided, in certain embodiments, as explained above (e.g., synthesized and/or purchased commercially). In step 202, particle 104 may, in some embodiments, be functionalized via a reaction with functional precursor 120 (denoted as R in FIG. 2), thereby providing particle 104 functionalized with initiator 122.

The functional precursor may comprise any of a variety of suitable materials. In certain embodiments, the functional precursor comprises one or more moieties that are capable of binding (e.g., covalently bonding) to one or more surfaces of the particle. In some embodiments wherein the particle comprises SiO₂, for example, the precursor comprises a silane moiety that is capable of binding with the SiO₂ surface. In certain non-limiting embodiments, for example, the precursor comprises a triethoxysilane moiety.

In certain embodiments, the initiator of the resulting particle functionalized with the initiator is capable of reacting with a polymer precursor used to form the polymer-grafted particles, as explained in further detail herein. In certain embodiments, the initiator comprises an ester moiety, an isobutyrate moiety, an azide moiety, an alkyne moiety, a carboxylic acid moiety, an amine moiety, a thiol moiety, an epoxide moiety, a vinyl moiety, and/or a halide moiety (e.g., a bromide, a chloride). Other moieties and/or functional groups are also possible.

In step 204, initiator 122 is reacted with polymer precursor 124 (denoted as R' in FIG. 2), thereby providing polymer-grafted particle 102 comprising particle 104 grafted with polymer chains 108.

The polymer precursor may comprise any of a variety of suitable materials as long as the polymer precursor comprises a moiety that is reactive with the initiator functionalized on the particle. In some embodiments, for example, the polymer precursor comprises an acrylate, methacrylate, and/or ester moiety. Other moieties are also possible. Non-limiting examples of polymer precursors include n-butyl acrylate and/or tert-butyl acrylate. Other polymer precursors are also possible.

The initiator and the polymer precursor may react via polymerization, in some embodiments. The reaction between the initiator and the polymer precursor to provide the polymer chains may be any of a variety of suitable polymerization reactions, including, for example, atom transfer radical polymerization (ATRP).

In certain embodiments, and as depicted in FIG. 2, the grafting of the polymer chains is a "grafting from" approach in which a polymer chain is initiated and propagated at the surface of the particle. Although the "grafting from" approach is depicted in FIG. 2, other grafting mechanisms are possible, as the disclosure is not meant to be limiting in this regard. In some embodiments, for example, a "grafting to" approach may also be utilized, in which a polymer chain is first synthesized and then grafted to the surface of the particle.

The polymer-grafted particle may comprise the polymer chains in any of a variety of suitable amounts. In certain embodiments, for example, the polymer-grafted particle comprises the polymer chains in an amount greater than or equal to 10 wt. %, greater than or equal to 20 wt. %, greater than or equal to 30 wt. %, greater than or equal to 40 wt. %, greater than or equal to 50 wt. %, greater than or equal to 60 wt. %, greater than or equal to 70 wt. %, or greater than or equal to 80 wt. % based on the total weight of the polymer-grafted particle. In some embodiments, the polymer-grafted particle comprises the polymer chains in an amount less than or equal to 90 wt. %, less than or equal to 80 wt. %, less than or equal to 70 wt. %, less than or equal to 60 wt. %, less than or equal to 50 wt. %, less than or equal to 40 wt. %, less than or equal to 30 wt. %, or less than or equal to 20 wt. % based on the total weight of the polymer-grafted particle. Combinations of the above recited ranges are possible (e.g., the polymer-grafted particle comprises the polymer chains in an amount between greater than or equal to 10 wt. % and less than or equal to 90 wt. % based on the total weight of the polymer-grafted particle, the polymer-grafted particle comprises the polymer chains in an amount between greater than or equal to 30 wt. % and less than or equal to 40 wt. % based on the total weight of the polymer-grafted particle). Other ranges are also possible. Methods of determining the amount (e.g., wt. %) of the polymer chains in the polymer-grafted particle include, but are not limited to, TGA, UV-vis spectroscopy, IR spectroscopy, and/or TEM.

The polymer-grafted particle may comprise a ratio of particle to polymer in any of a variety of suitable amounts. In some embodiments, for example, the polymer-grafted particle comprises a wt. % ratio of particle to polymer of at least at least 1:10, at least 1:8, at least 1:5, at least 1:4, at least 1:3, at least 1:2, at least 1:1, at least 1:0.5, at least 1:0.25, at least 1:0.2 or at least 1:0.1. In certain embodiments, the polymer-grafted particle comprises a wt. % ratio of particle to polymer of less than or equal to 10:1, less than or equal to 8:1, less than or equal to 5:1, less than or equal to 4:1, less than or equal to 3:1, less than or equal to 2:1, less than or equal to 1:1, less than or equal to 0.5:1, less than or equal to 0.25:1, less than or equal to 0.2:1, or less than or equal to 0.1:1. Combinations of the above recited ranges are possible (e.g., the polymer-grafted particle comprises a wt. % ratio of particle to polymer of between at least 1:10 and less than or equal to 10:1, the polymer-grafted particle comprise a wt. % ratio of particle to polymer of between at least 1:2 and less than or equal to 2:1). Other ranges are also possible. Methods of determining the ratio of particle to polymer in the polymer-grafted particle include, but are not limited to, TGA, UV-vis spectroscopy, IR spectroscopy, and/or TEM.

According to certain embodiments, the polymer-grafted particles may be employed as an additive (e.g., in a polymer matrix). In some embodiments, for example, a polymer matrix (e.g., a pressure-sensitive adhesive) may comprise the polymer-grafted particles. As explained in further detail herein, the polymer-grafted particles may advantageously improve one or more mechanical properties of the polymer matrix (e.g., pressure-sensitive adhesive).

As explained in further detail herein, the pressure-sensitive adhesive may comprise the additive in a high filler loading while maintaining a substantially uniform distribution of the additive throughout the volume of the pressure-sensitive adhesive. A substantially uniform distribution of the particles (e.g., polymer-grafted particles) throughout the volume of the pressure-sensitive adhesive advantageously results in no or essentially no particle aggregation within the pressure-sensitive adhesive, thereby avoiding unfavorable interactions and/or agglomerations that ultimately lower the mechanical performance of the material. In some embodiments, the particles (e.g., polymer-grafted particles) may be substantially uniformly distributed throughout the volume of the pressure-sensitive adhesive due to the miscibility of the particles (e.g., polymer-grafted particles) and one or more components of the pressure-sensitive adhesive (e.g., one or more base polymer components).

In certain embodiments, the particles (e.g., polymer-grafted particles) may be substantially uniformly distributed throughout the volume of the pressure-sensitive adhesive across a cross-sectional area of the pressure-sensitive adhesive. In some embodiments, the particles (e.g., polymer-grafted particles) may be substantially uniformly distributed throughout the volume of the pressure-sensitive adhesive across a cross-sectional area of the pressure-sensitive adhesive that is perpendicular to the thickness of the pressure-sensitive adhesive.

Figure 3:
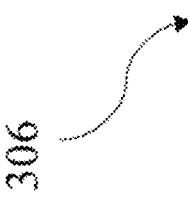
FIG. 3 shows, according to some embodiments, a cross-sectional schematic diagram of a pressure-sensitive adhesive.
Figure 3:
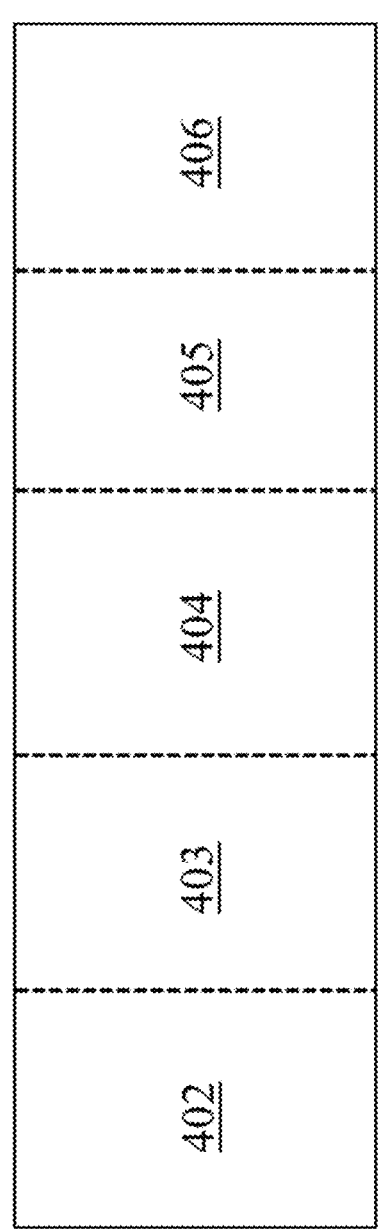

FIG. 3 shows, according to some embodiments, a cross-sectional schematic diagram of a pressure-sensitive adhesive. Referring to FIG. 3, the amount of particles (e.g., polymer-grafted particles) may not vary by more than 50%, by more than 40%, by more than 30%, by more than 20%, by more than 10%, by more than 5%, or by more than 1% in any given first arbitrary sub-section of pressure-sensitive adhesive 306 (e.g., sub-section 402, sub-section 403, sub-section 404, sub-section 405, or sub-section 406) as compared to any given second arbitrary sub-section of pressure-sensitive adhesive 306 that is different than the first arbitrary sub-section. In certain embodiments, the first and second arbitrary sub-sections each comprise at least 10%, at least 20%, at least 30%, at least 40%, or at least 50% of a cross-section of the pressure-sensitive adhesive taken across any axis of the pressure-sensitive adhesive. According to certain embodiments, methods of evaluating the distribution of the particles (e.g., polymer-grafted particles) throughout the volume of the pressure-sensitive adhesive may include, but are not limited to, electron microscopy.

The pressure-sensitive adhesive may comprise the polymer-grafted particles in any of a variety of suitable amounts. According to some embodiments, the pressure-sensitive adhesive comprises the polymer-grafted particles in a relatively low amount. In certain embodiments, for example, the pressure-sensitive adhesive comprises the polymer-grafted particles in an amount greater than or equal to 0.01 wt. %, greater than or equal to 0.05 wt. %, greater than or equal to 0.1 wt. %, greater than or equal to 0.2 wt. %, greater than or equal to 0.5 wt. %, greater than or equal to 1 wt. %, greater than or equal to 2 wt. %, greater than or equal to 5 wt. %, greater than or equal to 10 wt. %, greater than or equal to 15 wt. %, or greater than or equal to 20 wt. % versus the total weight of the pressure-sensitive adhesive. In some embodiments, the pressure-sensitive adhesive comprises the polymer-grafted particles in an amount less than or equal to 25 wt. %, less than or equal to 20 wt. %, less than or equal to 15 wt. %, less than or equal to 10 wt. %, less than or equal to 5 wt. %, less than or equal to 2 wt. %, less than or equal to 1 wt. %, less than or equal to 0.5 wt. %, less than or equal to 0.2 wt. %, less than or equal to 0.1 wt. %, or less than or equal to 0.05 wt. % versus the total weight of the pressure-sensitive adhesive. Combinations of the above recited ranges are possible (e.g., the pressure-sensitive adhesive comprises the polymer-grafted particles in an amount between greater than or equal 0.01 wt. % and less than or equal to 25 wt. % versus the total weight of the pressure-sensitive adhesive, the pressure-sensitive adhesive comprises the polymer-grafted particles in an amount between greater than or equal to 1 wt. % and less than or equal to 2 wt. % versus the total weight of the pressure-sensitive adhesive). Other ranges are also possible. The amount (e.g., wt. %) of the polymer-grafted particles in the pressure-sensitive adhesive may be determined based on the amount of each component (e.g., the particle-grafted polymers, the one or more based polymer components, the crosslinking agent) used to formulate the pressure-sensitive adhesive. Other methods of determining the amount (e.g., wt. %) of the polymer-grafted particles in the pressure-sensitive adhesive include, but are not limited to, TGA and/or TEM.

According to some embodiments, the pressure-sensitive adhesive may comprise one or more base polymer components in addition to the polymer-grafted particles. The base polymer component may be chosen, in some embodiments, such that the one or more base polymer components are miscible (i.e., capable of forming a homogeneous mixture) with the polymer-grafted particles. The compatibility (e.g., miscibility) of the polymer-grafted particles and the one or more base polymer components of the pressure-sensitive adhesive advantageously prevents aggregation of the polymer-grafted particles due to steric repulsion from the polymer chains, therefore ensuring the material is viscoelastic. In certain embodiments, a polymer-grafted particle that is miscible with one or more base polymer components of the pressure-sensitive adhesive in which the polymer-grafted particle is to be added may advantageously provide an increase in one or more desirable mechanical properties of the pressure-sensitive adhesive (e.g., a cohesive strength) as compared to an essentially identical pressure-sensitive adhesive that is otherwise equivalent but does not include the polymer-grafted particles.

The pressure-sensitive adhesive may comprise any of a variety of suitable base polymer components. In certain embodiments, the base polymer component comprises an elastomer. According to some embodiments, the base polymer component may comprise an acrylate, a methacrylate, and/or a polyester. Other polymers are also possible.

The pressure-sensitive adhesive may comprise any of a variety of suitable amounts of the one or more base polymer components. In certain embodiments, for example, the pressure-sensitive adhesive comprises the one or more base polymer components in an amount greater than or equal to 70 wt. %, greater than or equal to 75 wt. %, greater than or equal to 80 wt. %, greater than or equal to 85 wt. %, greater than or equal to 90 wt. %, greater than or equal to 95 wt. %, greater than or equal to 98 wt. %, greater than or equal to 99 wt. %, greater than or equal to 99.5 wt. %, greater than or equal to 99.8 wt. %, or greater than or equal to 99.9 wt. % versus the total weight of the pressure-sensitive adhesive. In some embodiments, the pressure-sensitive adhesive comprises the one or more base polymer components in an amount less than or equal to 99.95 wt. %, less than or equal to 99.9 wt. %, less than or equal to 99.8 wt. %, less than or equal to 99.5 wt. %, less than or equal to 99 wt. %, less than or equal to 98 wt. %, less than or equal to 95 wt. %, less than or equal to 90 wt. %, less than or equal to 85 wt. %, less than or equal to 80 wt. %, or less than or equal to 75 wt. % versus the total weight of the pressure-sensitive adhesive. Combinations of the above recited ranges are possible (e.g., the pressure-sensitive adhesive comprises the one or more base polymer components in an amount between greater than or equal to 75 wt. % and less than or equal to 99.95 wt. % versus the total weight of the pressure-sensitive adhesive, the pressure-sensitive adhesive comprises the one or more base polymer components in an amount between greater than or equal to 98 wt. % and less than or equal to 99 wt. % versus the total weight of the pressure-sensitive adhesive). Other ranges are also possible. The amount (e.g., wt. %) of the one or more base polymers components in the pressure-sensitive adhesive may be determined based on the amount of each component (e.g., the polymer-grafted particles, the one or more based polymer components, the crosslinking agent) used to formulate the pressure-sensitive adhesive. Other methods of determining the amount (e.g., wt. %) of the one or more base polymer components in the pressure-sensitive adhesive include, but are not limited to, TGA and/or TEM.

According to certain embodiments, the pressure-sensitive adhesive may comprise one or more crosslinking agents. As explained in further detail herein, the crosslinking agent may be capable of reacting (e.g., crosslinking) with one or more polymer chains of the polymer-grafted particle and/or one or more base polymer components of the pressure-sensitive adhesive. The crosslinking agent may, in some embodiments, be capable of hydrogen bonding, dynamic covalent interactions, ionic interactions, and/or metal coordination interactions. Examples of crosslinking agents include, for example, a metal coordination compound. In some embodiments, for example, the crosslinking agent may comprise aluminum (Al), zinc (Zn), iron (Fe), copper (Cu), and/or nickel (Ni). In some non-limiting embodiments, the crosslinking agent is aluminum(III) acetylacetonate (Al(acac)$_3$) or zinc oxide (ZnO). Other crosslinking agents are also possible.

The pressure-sensitive adhesive may comprise the crosslinking agent in any of a variety of suitable amounts. In some embodiments, for example, the pressure-sensitive adhesive comprises the crosslinking agent in an amount greater than or equal to 0.01 wt. %, greater than or equal to 0.02 wt. %, greater than or equal to 0.04 wt. %, greater than or equal to 0.06 wt. %, greater than or equal to 0.08 wt. %, greater than or equal to 0.1 wt. %, greater than or equal to 0.15 wt. %, greater than or equal to 0.2 wt. %, greater than or equal to 0.25 wt. %, greater than or equal to 0.3 wt. %, greater than or equal to 0.35 wt. %, greater than or equal to 0.4 wt. %, greater than or equal to 0.45 wt. %, greater than or equal to 0.5 wt. %, or greater than or equal to 0.55 wt. % versus the total weight of the pressure-sensitive adhesive. In certain embodiments, the pressure-sensitive adhesive comprises the crosslinking agent in an amount less than or equal to 0.6 wt. %, less than or equal to 0.55 wt. %, less than or equal to 0.5 wt. %, less than or equal to 0.45 wt. %, less than or equal to 0.4 wt. %, less than or equal to 0.35 wt. %, less than or equal to 0.3 wt. %, less than or equal to 0.25 wt. %, less than or equal to 0.2 wt. %, less than or equal to 0.15 wt. %, less than or equal to 0.1 wt. %, less than or equal to 0.08 wt. %, less than or equal to 0.06 wt. %, less than or equal to 0.04 wt. %, or less than or equal to 0.02 wt. % versus the total weight of the pressure-sensitive adhesive. Combinations of the above recited ranges are possible (e.g., the pressure-sensitive adhesive comprises the crosslinking agent in an amount between greater than or equal to 0.01 wt. % and less than or equal to 0.6 wt. % versus the total weight of the pressure-sensitive adhesive, the pressure-sensitive adhesive comprises the crosslinking agent in an amount between greater than or equal to 0.04 wt. % and less than or equal to 0.06 wt. % versus the total weight of the pressure-sensitive adhesive). Other ranges are also possible. The amount (e.g., wt. %) of the crosslinking agent in the pressure-sensitive adhesive may be determined based on the amount of each component (e.g., the one or more based polymer components, the crosslinking agent, the particle-grafted polymers) used to formulate the pressure-sensitive adhesive. Other methods of determining the amount (e.g., wt. %) of the crosslinking agent in the pressure-sensitive adhesive include, but are not limited to. TGA, inductively coupled plasma (ICP) mass spectrometry, and/or elemental analysis.

According to certain embodiments, the polymer-grafted particles may interact with one or more components of the pressure-sensitive adhesive, such as the one or more base polymer components and/or the crosslinking agent. In some embodiments, for example, the particle surface-grafted polymer chains may interact with at least one component (e.g., one or more base polymer components, the crosslinking agent) of the pressure-sensitive adhesive. The particle surface-grafted polymer chains may, in some embodiments, have more one or more interactions (e.g., one or more bonding interactions) with at least one component (e.g., one or more base polymer components, the crosslinking agent) of the pressure-sensitive adhesive. For example, in certain embodiments, the polymer chains may non-covalently interact, covalently interact, and/or otherwise be physically entangled with at least one component (e.g., one or more base polymer components, the crosslinking agent) of the pressure-sensitive adhesive.

In certain embodiments, at least some of the particle surface-grafted polymer chains are non-covalently bound to at least one base polymer component and/or the crosslinking agent of the pressure-sensitive adhesive. Examples of non-covalent interactions include, for example, electrostatic (e.g., ionic) interactions, van der Waals interactions, and/or hydrogen-bonding interactions. In certain embodiments wherein a crosslinking agent is employed, the particle-surface grafted polymer chains may ionically crosslink with the crosslinking agent, which in turn crosslinks (e.g., ionically crosslinks, covalently crosslinks) with at least one base polymer component of the pressure-sensitive adhesive. In certain embodiments, for example, at least a portion of the polymer chains (e.g., an acrylate) may be negatively charged and at least a portion of the crosslinking agent (e.g., a metal) may be positively charged, resulting in the portion of the polymer chains and the portion of the crosslinking agent non-covalently (e.g., ionically) crosslinking.

In some embodiments, the particle surface-grafted polymer chains are covalently bound to at least one base polymer component and/or the crosslinking agent of the pressure-sensitive adhesive. In certain embodiments wherein a crosslinking agent is employed, the particle-surface grafted polymer chains may covalently crosslink with the crosslinking agent, which in turn crosslinks (e.g., ionically crosslinks, covalently crosslinks) with at least one base polymer component of the pressure-sensitive adhesive.

According to certain embodiments, the particle surface-grafted polymer chains may be physically entangled with at least one base polymer component of the pressure-sensitive adhesive.

It may be particularly advantageous for the particle surface-grafted polymer chains to have more than one interaction with at least one component of the pressure-sensitive adhesive (e.g., one or more base polymer components, the crosslinking agent), which may enhance one or more mechanical properties of the pressure-sensitive adhesive. In some embodiments, for example, the polymer chains may non-covalently interact with (e.g., via one or more ionic interactions, via ionic crosslinking) and be physically entangled with at least one component of the pressure-sensitive adhesive (e.g., one or more base polymer components, the crosslinking agent). In other embodiments, the polymer chains may covalently interact with (via one or more covalent interactions, via covalent crosslinking) and be physically entangled with at least one component of the pressure-sensitive adhesive (e.g., one or more base polymer components, the crosslinking agent). In yet other embodiments, the polymer chains may non-covalently interact with (e.g., via one or more ionic interactions, via ionic crosslinking) and covalently interact with (e.g., via one or more covalent interactions, via covalent crosslinking) at least one component of the pressure-sensitive adhesive (e.g., one or more base polymer components, the crosslinking agent).

The pressure-sensitive adhesive may be any of a variety of suitable shapes and/or sizes. In some embodiments, for example, the pressure-sensitive adhesive is a two-dimensional film and/or layer.

The pressure-sensitive adhesive may be fabricated by methods that would be known to a person of ordinary skill in the art. In certain embodiments, for example, the components of the pressure-sensitive adhesive (e.g., the one or more base polymer components, the polymer-grafted nanoparticles, the crosslinking agent) may be combined, mechanically mixed, and applied to a base substrate (e.g., a polyethylene terephthalate release liner).

The pressure-sensitive adhesive may have any of a variety of suitable glass transition temperatures. According to some embodiments, the pressure-sensitive adhesive may have a relatively low glass transition temperature, as use of the pressure-sensitive adhesive below the glass transition temperature may render the material too brittle. In some embodiments, for example, the pressure-sensitive adhesive has a glass transition temperature greater than or −50 degrees Celsius, greater than or equal to −40 degrees Celsius, greater than or equal to −30 degrees Celsius, greater than or equal to −20 degrees Celsius, greater than or equal to −10 degrees Celsius, greater than or equal to 0 degrees Celsius, greater than or equal to 10 degrees Celsius, greater than or equal to 20 degrees Celsius, greater than or equal to 30 degrees Celsius, greater than or equal to 40 degrees Celsius, greater than or equal to 50 degrees Celsius, greater than or equal to 60 degrees Celsius, greater than or equal to 70 degrees Celsius, greater than or equal to 80 degrees Celsius, or greater than or equal to 90 degrees Celsius. In certain embodiments, the pressure-sensitive adhesive has a glass transition temperature less than or equal to 100 degrees Celsius, less than or equal to 90 degrees Celsius, less than or equal to 80 degrees Celsius, less than or equal to 70 degrees Celsius, less than or equal to 60 degrees Celsius, less than or equal to 50 degrees Celsius, less than or equal to 40 degrees Celsius, less than or equal to 30 degrees Celsius, less than or equal to 20 degrees Celsius, less than or equal to 10 degrees Celsius, less than or equal to 0 degrees Celsius, less than or equal to −10 degrees Celsius, less than or equal to −20 degrees Celsius, less than or equal to −30 degrees Celsius, or less than or equal to −40 degrees Celsius. Combinations of the above recited ranges are possible (e.g., the pressure-sensitive adhesive has a glass transition temperature between greater than or equal to −50 degrees Celsius and less than or equal to 100 degrees Celsius, the pressure-sensitive adhesive has a glass transition temperature between greater than or equal to 10 degrees Celsius and less than or equal to 20 degrees Celsius). Other ranges are also possible. In certain embodiments, the glass transition temperature of the pressure-sensitive adhesive may be determined by differential scanning calorimetry (DSC), dynamic mechanical analysis (DMA), and/or thermochemical analysis (TMA). In some embodiments, the glass transition temperature of the pressure-sensitive adhesive may be determined using rheological measurements.

Figures 4A, 4B:
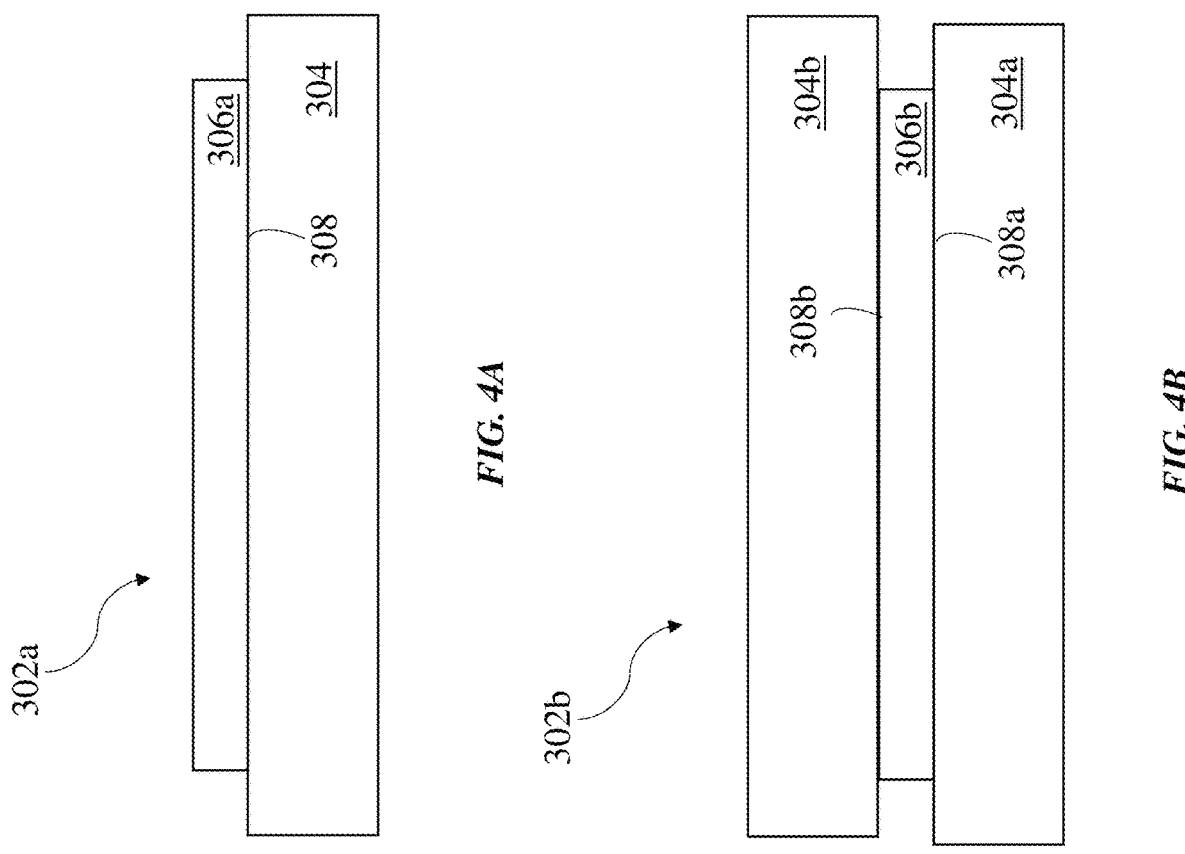
FIG. 4A shows, according to some embodiments, a schematic diagram of a single-sided pressure-sensitive adhesive associated with a substrate.
FIG. 4B shows, according to some embodiments, a schematic diagram of a double-sided pressure-sensitive adhesive associated with two substrates.

According to certain embodiments, an article is described, the article comprising one or more substrates and a pressure-sensitive adhesive associated with the one or more substrates. In some embodiments, the pressure-sensitive adhesive may be a single-sided pressure-sensitive adhesive wherein one surface of the pressure-sensitive adhesive is configured to associate with a substrate. For example, FIG. 4A shows, according to some embodiments, a schematic diagram of article 302a comprising pressure-sensitive adhesive 306a associated with substrate 304. As shown in FIG. 4A, pressure-sensitive adhesive 306a may be a single-sided pressure-sensitive adhesive such that pressure-sensitive adhesive 306a is associated with substrate 304 via adhesive surface 308. FIG. 4B shows, according to some embodiments, a schematic diagram of article 302b comprises pressure-sensitive adhesive 306b associated with first substrate 304a and second substrate 304b. As shown in FIG. 4B, pressure-sensitive adhesive 306b may be a double-sided pressure-sensitive adhesive such that pressure-sensitive adhesive 306b is associated with substrate 304a via adhesive surface 308a and substrate 304b via adhesive surface 308b.

The pressure-sensitive adhesive may have any of a variety of suitable adhesive strengths. In certain embodiments, for example, the adhesive strength of the pressure-sensitive adhesive is greater than or equal to 0.5 N/cm, greater than or equal to 1 N/cm, greater than or equal to 2 N/cm, greater than or equal to 3 N/cm, greater than or equal to 4 N/cm, greater than or equal to 5 N/cm, greater than or equal to 6 N/cm, greater than or equal to 7 N/cm, greater than or equal to 8 N/cm, greater than or equal to 9 N/cm, greater than or equal to 10 N/cm, or greater than or equal to 11 N/cm. In some embodiments, the adhesive strength of the pressure-sensitive adhesive is less than or equal to 12 N/cm, less than or equal to 11 N/cm, less than or equal to 10 N/cm, less than or equal to 9 N/cm, less than or equal to 8 N/cm, less than or equal to 7 N/cm, less than or equal to 6 N/cm, less than or equal to 5 N/cm, less than or equal to 4 N/cm, less than or equal to 3 N/cm, less than or equal to 2 N/cm, or less than or equal to 1 N/cm. Combinations of the above recited ranges are possible (e.g., the adhesive strength of the pressure-sensitive adhesive is between greater than or equal to 0.5 N/cm and less than or equal to 12 N/cm, the adhesive strength of the pressure-sensitive adhesive is between greater than or equal to 2 N/cm and less than or equal to 3 N/cm). Other ranges are also possible. The adhesive strength may be determined, in some embodiments, by 90 degree and/or 180 degree peel adhesion strength tests, as would be known to a person of ordinary skill in the art.

According to some embodiments, it may be advantageous in certain applications for the adhesive strength of the pressure-sensitive adhesive to be comparable to an adhesive strength of an essentially identical pressure-sensitive adhesive that is otherwise equivalent but does not include the polymer-grafted particles, e.g., to be able to remove an adhered substrate from the pressure-sensitive adhesive without an increase in peel strength. In certain embodiments, for example, the adhesive strength of the pressure-sensitive adhesive may decrease no more than 1%, no more than 2%, no more than 5%, no more than 10%, or no more than 20% as compared to an adhesive strength of an essentially identical composition that is otherwise equivalent but does not include the polymer-grafted particles under essentially identical conditions.

According to certain embodiments, the adhesive strength of the pressure-sensitive adhesive may be greater than or equal to 80%, greater than or equal to 90%, greater than or equal to 100%, or greater than or equal to 110% of the adhesive strength of the essentially identical pressure-sensitive adhesive that is otherwise equivalent but does not include the polymer-grafted particles under essentially identical conditions. In some embodiments, the adhesive strength of the pressure-sensitive adhesive is less than or equal to 120%, less than or equal to 110%, less than or equal to 100%, or less than or equal to 90% of the adhesive strength of the essentially identical pressure-sensitive adhesive that is otherwise equivalent but does not include the polymer-grafted particles under essentially identical conditions.

Combinations of the above recited ranges are possible (e.g., the adhesive strength of the pressure-sensitive adhesive is between greater than or equal to 80% and less than or equal to 120% of the adhesive strength of the essentially identical pressure-sensitive adhesive that is otherwise equivalent but does not include the polymer-grafted particles under essentially identical conditions, the adhesive strength of the pressure-sensitive adhesive is between greater than or equal to 100% and less than or equal to 110% of the adhesive strength of the essentially identical pressure-sensitive adhesive that is otherwise equivalent but does not include the polymer-grafted particles under essentially identical conditions). Other ranges are also possible.

In certain embodiments, the adhesion time of the pressure-sensitive adhesive prior to failure under a static load is greater than or equal to 1.2 times greater, greater than or equal to 1.4 greater, greater than or equal to 1.6 times greater, greater than or equal to 1.8 times greater, greater than or equal to 2 times greater, greater than or equal to 2.2 times greater, greater than or equal to 2.4 times greater, greater than or equal to 2.6 times greater, greater than or equal to 2.8 times greater, greater than or equal to 3 times greater, greater than or equal to 3.2 times greater, greater than or equal to 3.4 times greater, greater than or equal to 3.6 times greater, or greater than or equal to 3.8 times greater than an adhesion time of an essentially identical pressure-sensitive adhesive that is otherwise equivalent but does not include the polymer-grafted particles under essentially identical conditions. According to some embodiments, the adhesion time of the pressure-sensitive adhesive prior to failure under a static load is less than or equal to 4 times greater, less than or equal to 3.8 times greater, less than or equal to 3.6 times greater, less than or equal to 3.4 times greater, less than or equal to 3.2 times greater, less than or equal to 3 times greater, less than or equal to 2.8 times greater, less than or equal to 2.6 times greater, less than or equal to 2.4 times greater, less than or equal to 2.2 times greater, less than or equal to 2 times greater, less than or equal to 1.8 times greater, less than or equal to 1.6 times greater, or less than or equal to 1.4 times greater than the adhesion time of an essentially identical pressure-sensitive adhesive that is otherwise equivalent but does not include the polymer-grafted particles under essentially identical conditions. Combinations of the above recited ranges are possible (e.g., the adhesion time of the pressure-sensitive adhesive prior to failure under a static load is between greater than or equal to 1.2 times and less than or equal to 4 times greater than the adhesion time of an essentially identical pressure-sensitive adhesive that is otherwise equivalent but does not include the polymer-grafted particles under essentially identical conditions, the adhesion time of the pressure-sensitive adhesive prior to failure under a static load is between greater than or equal to 2.8 times and less than or equal to 3.2 times greater than the adhesion time of an essentially identical pressure-sensitive adhesive that is otherwise equivalent but does not include the polymer-grafted particles under essentially identical conditions). Other ranges are also possible.

The pressure-sensitive adhesive may have any of a variety of suitable cohesive strengths. In certain embodiments, for example, the cohesive strength of the pressure-sensitive adhesive, as measured by the dynamic overlap shear strength, is greater than or equal to 50 kPa, greater than or equal to 100 kPa, greater than or equal to 150 kPa, greater than or equal to 200 kPa, greater than or equal to 250 kPa, greater than or equal to 300 kPa, greater than or equal to 350 kPa, or greater than or equal to 400 kPa. In some embodiments, the cohesive strength of the pressure-sensitive adhesive, as measured by the dynamic overlap shear strength, is less than or equal to 450 kPa, less than or equal to 400 kPa, less than or equal to 350 kPa, less than or equal to 300 kPa, less than or equal to 250 kPa, less than or equal to 200 kPa, less than or equal to 150 kPa, or less than or equal to 100 kPa.

Combinations of the above recited ranges are possible (e.g., the cohesive strength of the pressure-sensitive adhesive, as measured by the dynamic overlap shear strength, is between greater than or equal to 50 kPa and less than or equal to 450 kPa, the cohesive strength of the pressure-sensitive adhesive, as measured by the dynamic overlap shear strength, is between greater than or equal to 300 kPa and less than or equal to 400 kPa). Other ranges are also possible. The cohesive strength, as measured by the dynamic overlap shear strength, may be determined, in some embodiments, by dynamic overlap shear measurements, as would be known to a person of ordinary skill in the art.

In certain embodiments, it may be advantageous in some applications for the cohesive strength of the pressure-sensitive adhesive to have a higher cohesive strength as compared to a cohesive strength of an essentially identical pressure-sensitive adhesive that is otherwise equivalent but does not include the polymer-grafted particles, e.g., to be able to cleanly remove an adhered substrate from the pressure-sensitive adhesive without leaving behind residue of the pressure-sensitive adhesive on the removed substrate. In certain embodiments, for example, the cohesive strength of the pressure-sensitive adhesive may increase by at least 10%, at least 20%, at least 30%, or at least 40% as compared to a cohesive strength of an essentially identical composition that is otherwise equivalent but does not include the poly-mer-grafted particles under essentially identical conditions.

According to certain embodiments, the dynamic overlap shear strength of the pressure-sensitive adhesive is greater than or equal to 100%, greater than or equal to 110%, greater than or equal to 120%, or greater than or equal to 130%, or greater than or equal to 140% of a dynamic overlap shear strength of an essentially identical pressure-sensitive adhesive that is otherwise equivalent but does not include the polymer-grafted particles under essentially identical conditions. In some embodiments, the dynamic overlap shear strength of the pressure-sensitive adhesive is less than or equal to 150%, less than or equal to 140%, less than or equal to 130%, less than or equal to 120%, or less than or equal to 110% of the dynamic overlap strength of the essentially identical pressure-sensitive adhesive that is otherwise equivalent but does not include the polymer-grafted particles under essentially identical conditions. Combinations of the above recited ranges are possible (e.g., the dynamic overlap shear strength of the pressure-sensitive adhesive is between greater than or equal to 100% and less than or equal to 150% of the dynamic overlap shear strength of the essentially identical pressure-sensitive adhesive that is otherwise equivalent but does not include the polymer-grafted particles under essentially identical conditions, the dynamic overlap shear strength of the pressure-sensitive adhesive is between greater than or equal to 120% and less than or equal to 130% of the dynamic overlap shear strength of the essentially identical pressure-sensitive adhesive that is otherwise equivalent but does not include the polymer-grafted particles under essentially identical conditions). Other ranges are also possible.

The following examples are intended to illustrate certain embodiments of the present invention, but do not exemplify the full scope of the invention.

EXAMPLE 1

The following example describes pressure-sensitive adhesives comprising polymer-grafted particles.

The polymer-grafted nanoparticles (PGNPs) used herein comprise $SiO_2$ nanoparticle cores grafted with an elastomer corona of poly(n-butyl acrylate-co-acrylic acid) (poly(nBA-co-AA)) chains, with the acryilc acid (AA) monomers representing ~6 mol % of the polymer brush. The PGNP architecture allows for multiple methods of reinforcement that should improve material cohesion, including multivalent metal-ion-mediated crosslinking, polymer chain entanglement, and interfacial slip and chain alignment. By covalently tethering multiple polymer chains at their termini to an inorganic core, the brush architecture gives the PGNPs a greater degree of multivalency in their interactions with the pressure-sensitive adhesive (PSA) matrix than would be expected for equivalent length free polymer chains. With approximately $10^3$-$10^5$ grafted polymer chains per $SiO_2$ core, individual PGNPs possess a very substantial number of potential crosslinking and entanglement interactions even for relatively small core sizes. A list of PGNP compositions is shown in Table 1.

TABLE 1

| | | | | | | |
|---|---|---|---|---|---|---|
| | | PGNP Compositional Information | | | | |
| PGNP design | $SiO_2$ core diameter (nm) | P(nBA-co-AA) $M_n$ (g/mol) | $M_w$:$M_n$ | nBA:AA molar ratio | $\sigma$ (chains $nm^{-2}$) | Wt. % $SiO_2$ |
| 53 nm $SiO_2$-g-152 kDa P(nBA-co-AA) | 53.3 ± 6.6 | 151,610 | 2.228 | 0.951:0.049 | 0.123 | 33.049 |
| 52 nm $SiO_2$-g-44 kDa P(nBA-co-AA) | 51.8 ± 6.0 | 43,650 | 1.443 | 0.942:0.058 | 0.135 | 57.509 |
| 52 nm $SiO_2$-g-93 kDa P(nBA-co-AA) | 51.8 ± 6.0 | 92,752 | 1.271 | 0.944:0.056 | 0.129 | 41.923 |
| 52 nm $SiO_2$-g-183 kDa P(nBA-co-AA) | 51.8 ± 6.0 | 183,012 | 1.523 | 0.943:0.057 | 0.117 | 29.541 |
| 99 nm $SiO_2$-g-111 kDa P(nBA-co-AA) | 99.4 ± 11.1 | 111,393 | 1.292 | 0.942:0.058 | 0.147 | 50.180 |
| 222 nm $SiO_2$-g-207 kDa P(nBA-co-AA) | 222 ± 10.5 | 107360 | 2.224 | 0.941:0.059 | 0.082 | 78.122 |

Figure 6:
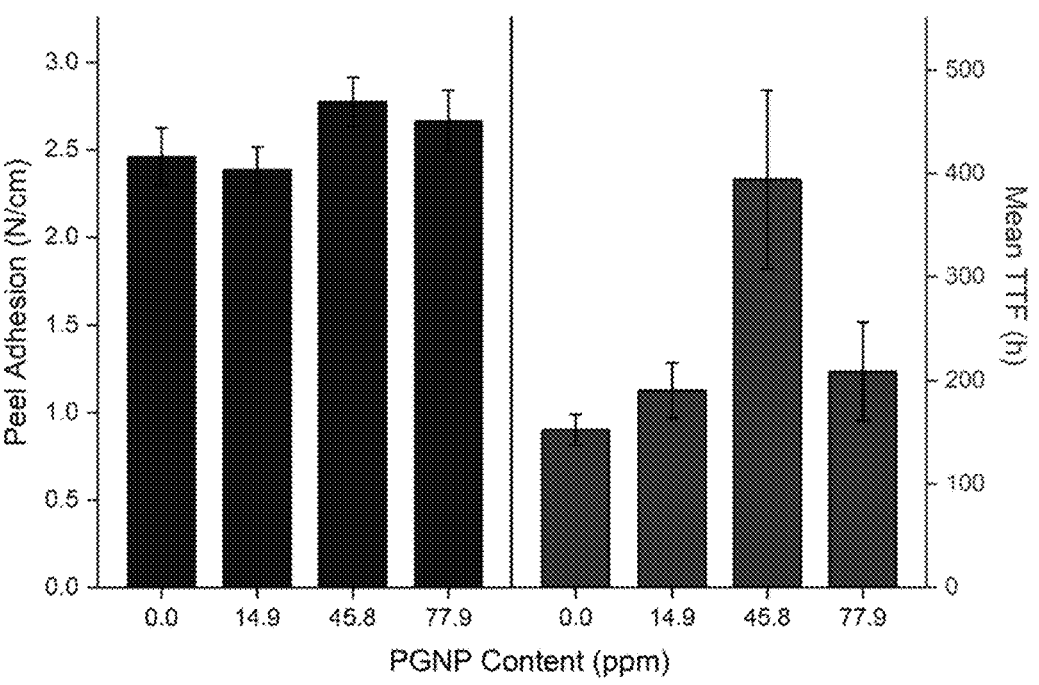
FIG. 6 shows, according to some embodiments, the effect of PGNP content on the peel adhesion and static shear time-to-failure (TTF) of nanocomposite pressure-sensitive adhesive (PSA) films.

The addition of PGNPs should therefore increase the cohesive strength of PSAs that use the same monomer chemistry and binding interactions to increase their adhesive properties, and the amount of this reinforcement could be tuned by both the number of PGNPs in the composite and the basic design parameters of each PGNP. To test these hypotheses, motorized peel adhesion and static hanging shear measurements were conducted according to ASTM standard protocols, and the results were compared against control films of either neat polymer or polymer with added silanol-terminated $SiO_2$ particles. The resulting peel adhesion data (FIG. 6, left) show that nanofilled PSA compositions possess small but marginal increases in adhesive strength from the polymer-only control films.

Cohesive strength (FIG. 6, right), on the other hand, was substantially altered by the inclusion of PGNP filler materials. The mean time-to-failure (TTF) of the PSA specimens concomitantly increased with PGNP content before reaching a maximum of over two-fold that of the polymer-only control PSA at 45 ppm PGNPs. The median TTF, on the other hand, saw an even greater increase of nearly three-fold over the median failure time of the control film (Table 2).

TABLE 2

Static shear TTF triplicate results for PSA
films with 0.2 wt. % Al(acac)$_3$ crosslinker

| PSA composition | Nanofiller conc. (ppm) | 500 g shear failure times (h) | Mean 500 g shear TTF (h) |
|---|---|---|---|
| Polymer-only control | N/A | 141.8747 | 152.4720 ± |
| | | 145.9636 | 14.9544 |
| | | 169.5778 | |
| Matrix polymer + 53 nm SiO$_2$-g-152 kDa P(nBa-co-AA) | 14.94 | 159.7194 | 190.5865 ± |
| | | 205.4694 | 26.7373 |
| | | 206.5706 | |
| | 45.77 | 295.2006 | 394.1018 ± |
| | | 431.9331 | 86.4355 |
| | | 455.1717 | |
| | 77.88 | 154.2564 | 208.7036 ± |
| | | 228.4825 | 47.7367 |
| | | 243.3719 | |

While these data are encouraging for the use of PGNPs as PSA additives to improve performance, the substantial variance between each specimen implied other convoluting factors beyond reasonable control (such as vibration of the building itself potentially affecting the hanging specimens). Thus, dynamic overlap shear testing was employed to gain more insight into compositional trends in stress/strain behavior.

Figure 7:
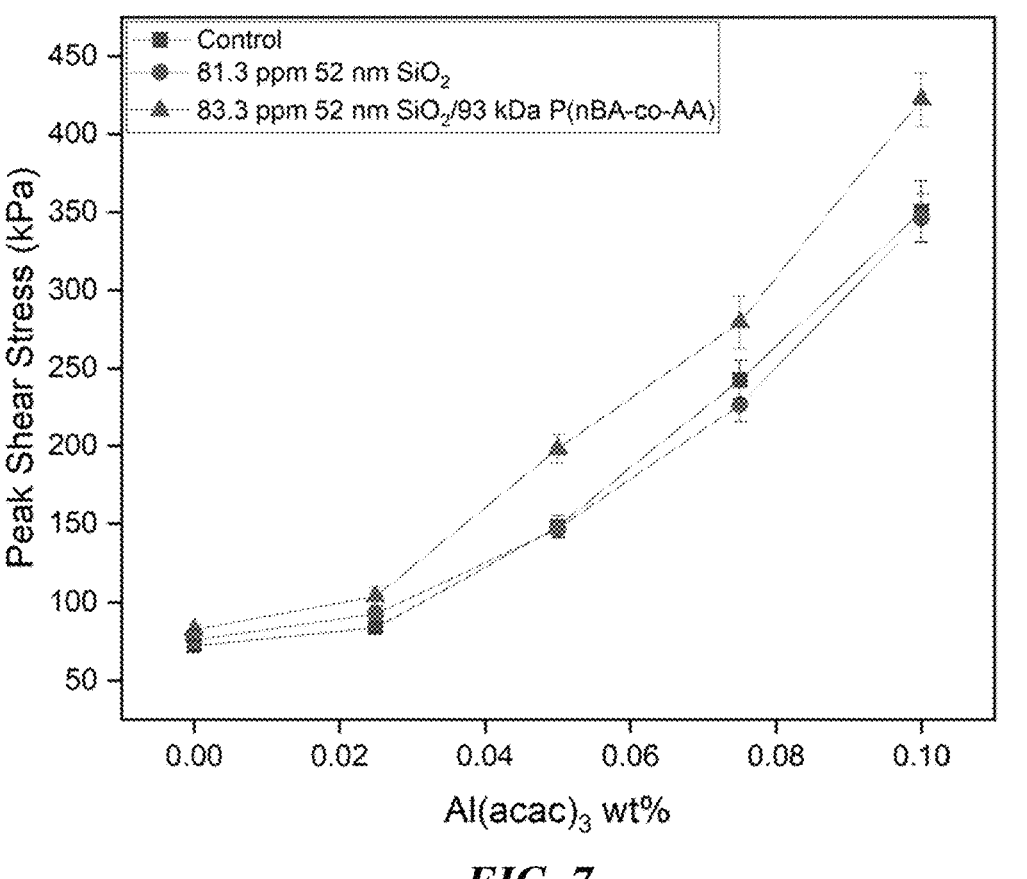
FIG. 7 shows, according to some embodiments, dynamic overlap shear data for unfilled, bare $SiO_2$-filled, and PGNP-filled PSA films at varying $Al(acac)_3$ weight percent (wt. %)
Figure 13:
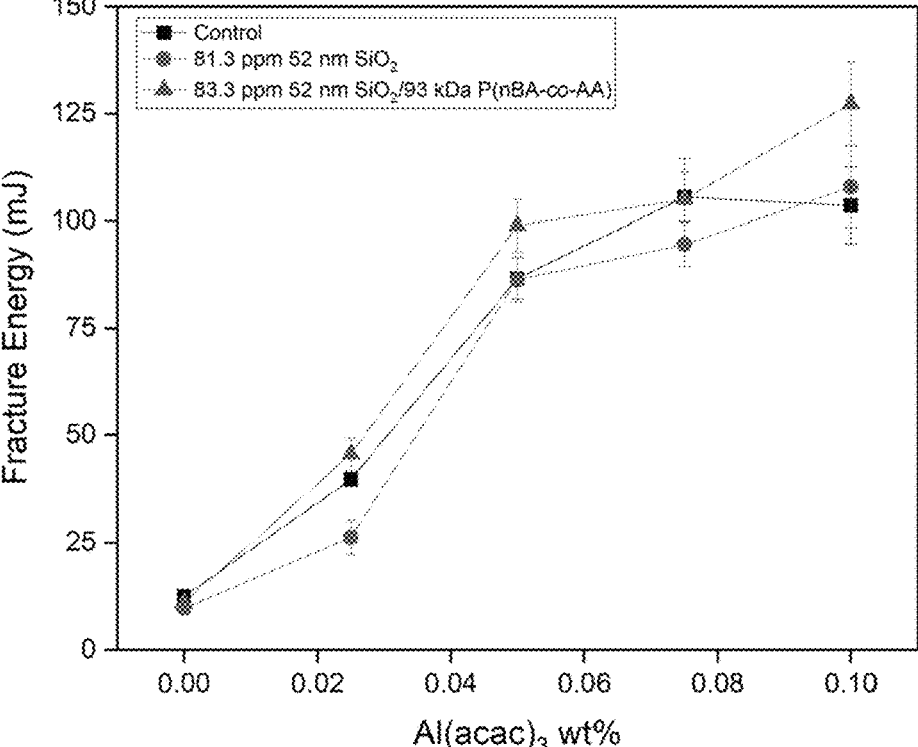
FIG. 13 shows, according to some embodiments, fracture energy data for unfilled, bare $SiO_2$-filled, and PGNP-filled PSA films at varying $Al(acac)_3$ wt. %.

For non-crosslinked PSA films (0 wt. % Al(acac)$_3$, FIG. 7) no statistically significant difference was observed between bare SiO$_2$ nanoparticles and PGNPs for the same nanofiller loading and core size, and both yielded marginal but statistically insignificant improvements over the control. With increasing crosslinker loading, however, the PGNPs exhibited a substantial and statistically significant improvement in shear resistance over the unfilled control. Furthermore, no statistically significant increase in shear resistance was observed for the bare silica particle control, indicating that the mechanical enhancement derived from PGNPs could not be explained by conventional nanofiller energy dissipation mechanisms as with SiO$_2$. These data are therefore in agreement with the hypothesis that PGNP multivalency results in greater cohesive strength in the overall film. This hypothesis is further supported by the overall lack of significant difference in fracture energies between the three experimental groups (FIG. 13), indicating that the total number of strain-resisting interactions is not changing to any significant degree, but rather that differences in their distribution throughout the matrix must therefore be responsible for the improved shear resistance.

Figure 8:
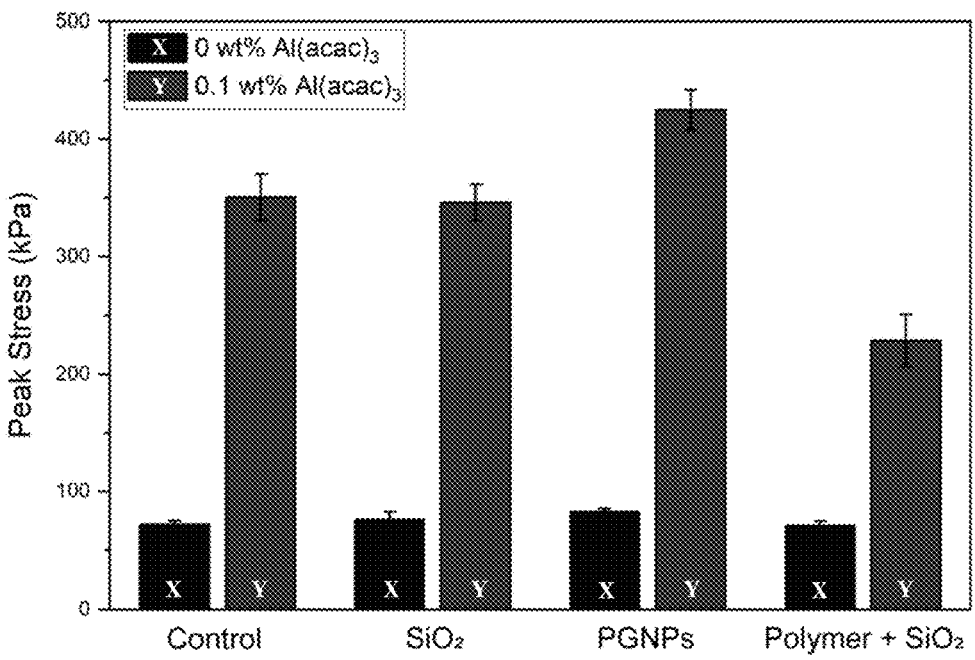
FIG. 8 shows, according to some embodiments, a comparison of dynamic overlap shear strength measurements between PSA films with no nanofiller, 81.3 ppm bare 52 nm $SiO_2$, 83.3 ppm 52 nm/93 kDa PGNPs, and a binary mixture of 81.3 ppm 52 nm $SiO_2$ and a commensurate amount of free 110 kDa ungrafted copolymer.

Further testing of the multivalency concept was conducted with a binary mixture of 52 nm bare SiO$_2$ and ungrafted 110 kDa P(nB a-co-AA) in respective amounts commensurate to the organic/inorganic wt. % for the 52 nm/93 kDa PGNPs given in Table 1. The purpose of this additional control was to examine if the mechanical reinforcing effects was due to the brush particle design, as opposed to the addition of particles and lower molecular weight polymers than those that comprised the matrix. In these samples, the concentration of nanoparticle filler was fixed at ~80 ppm, and both the monomer composition and film wt. % of "filler" polymer (both PGNP-grafted and ungrafted) were kept nearly identical. Dynamic overlap shear testing revealed that, for non-crosslinked films, PSAs with free polymer and bare silica nanofiller exhibited mechanical strengths slightly lower than all other compositions tested (FIG. 8, X), within margin of error for the control and approximately 15% lower than of PGNP-containing films. However, in the case of crosslinked PSAs (FIG. 8, Y), the reduction in strength from binary nanofiller was significantly more dramatic, falling approximately 35% and 46% below unfilled and PGNP-filled films, respectively.

Figure 9:
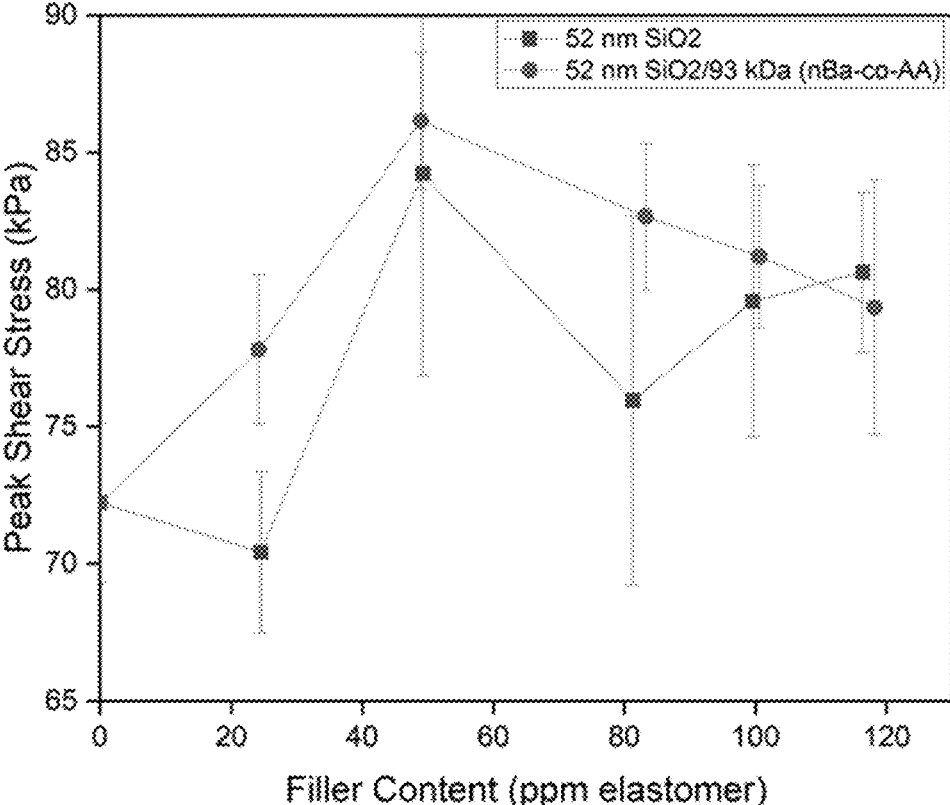
FIG. 9 shows, according to some embodiments, dynamic overlap shear data for PSA films with 0.1 wt. % $Al(acac)_3$ containing varying concentrations of bare $SiO_2$ and 52 nm/93 kDa PGNPs.

Having established that the PGNP architecture can indeed improve the cohesive properties of PSAs, the effects of PGNP loading on mechanical properties were examined to determine how the amount of particles affected the overall mechanical behavior of the films. For non-crosslinked PSA compositions (FIG. 9), both bare silica and PGNPs remained within margin of the control at all filler loadings, with PGNPs displaying a very marginal increase over SiO$_2$ nanoparticles. Both types of nanofiller reached peak shear resistance at the same filler loading (~50 ppm) and subsequently declined in mechanical performance with further amounts of filler, which indicates a similar mechanism for decline such as aggregation brought on by chemical incompatibility. The agglomerated particles act as significant stress-accumulators, thereby weakening PSA shear strength by serving as nucleation sites for cohesive failure. Additionally, unmodified/single-phase nanofillers typically begin aggregating even at very low filler concentrations in PSA systems, which then disperse evenly in the matrix before further aggregating once a critical nanofiller concentration is reached. This explains the initial drop in mechanical performance at low SiO$_2$ filler concentration (FIG. 9, squares).

Figure 10:
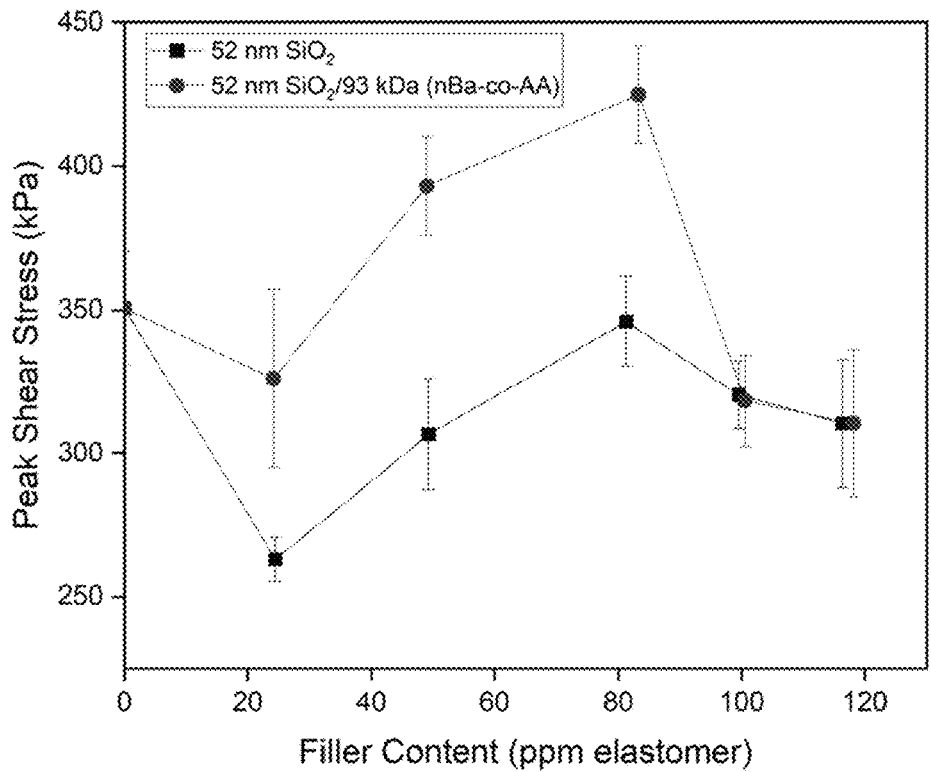
FIG. 10 shows, according to some embodiments, dynamic overlap shear data for PSA films with 0.1 wt. % $Al(acac)_3$ containing varying concentrations of bare $SiO_2$ and 52 nm/93 kDa PGNPs.

Filler content sweeps for highly-crosslinked PSA films showed a more statistically significant but otherwise very similar trend, in that both silica- and PGNP-loaded PSA films reached an apex at ~80 ppm filler loading before declining in mechanical performance. It should be noted, however, that the magnitude of the decline beyond 80 ppm was much greater than for non-crosslinked PSAs, which hints at a fundamental loading limit for these nanomaterials in the PSA composition that cannot be overcome with the addition of crosslinker, and can likely be attributed to the aggregation hypothesis discussed previously. Furthermore, the same initial decrease in mechanical strength for low nanoparticle filler content bare SiO$_2$ PSAs (FIG. 10, squares) mirrors that of their uncrosslinked counterparts (FIG. 9), indicating a similar aggregation behavior even at low filler concentration.

With respect to polymer graft length, it was hypothesized that an increase in graft M$_n$ would lead to an increase in shear resistance, albeit with diminishing returns. This trend was predicted because longer polymer grafts enable a greater number of crosslinking residues per individual PGNP, which should both enhance multivalency of crosslinking and allow for more effective chain entanglement to occur. However, longer brush-bound polymer chains can also result in entropic collapse in which they entangle with one-another, resulting in lower brush-matrix miscibility as the entangled brush chains push the surrounding matrix away rather than engage in beneficial crosslinking interactions.

Figure 11:
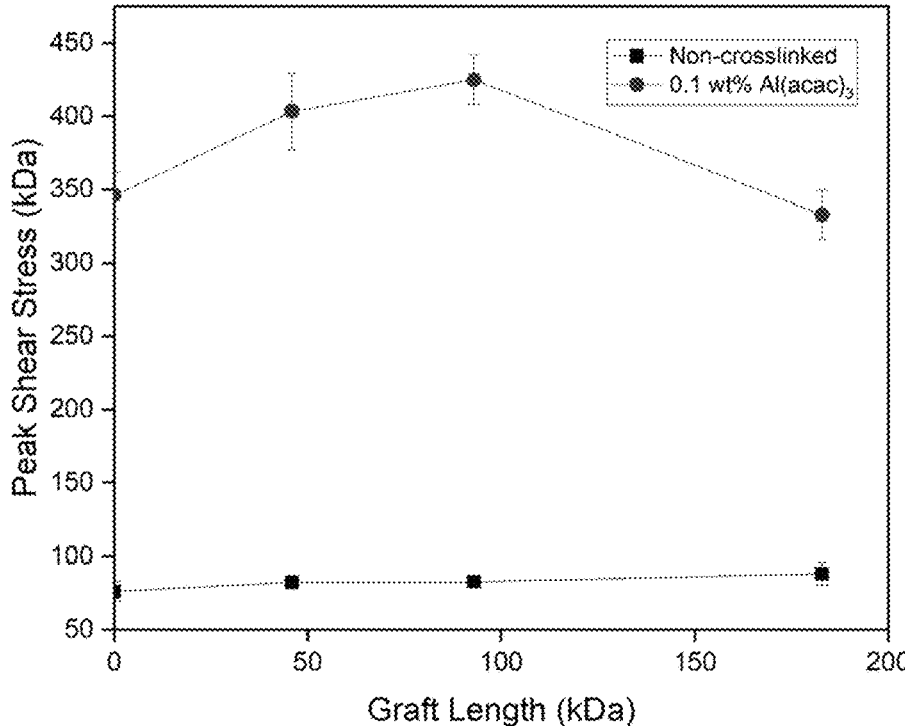
FIG. 11 shows, according to some embodiments, dynamic overlap shear data for PSA films containing ~80 ppm of nanofiller with polymer grafts of varying molecular weight.

For non-crosslinked PSA systems (FIG. 11, squares) a marginal increase in shear resistance was indeed observed with increasing polymer graft M$_n$, reaching a maximum at ~180 kDa. An analysis of a range of multiple M$_n$ values for highly-crosslinked PSA films (FIG. 11, circles) showed a distinct inflection point at 93 kDa, after which point mechanical performance decreased. It is possible that this inflection point occurs earlier in crosslinked films due to the self-entangled brush crosslinking preferentially with itself rather than with the surrounding elastomer. Consequently, the crosslinked collapsed brush would simply act as a very large filler particle excluding volume from the surrounding elastomer—a discontinuity in the extended crosslinked matrix—and would degrade shear resistance performance in the same way as their bare $SiO_2$ counterparts. This hypothesis is in agreement with computational studies that demonstrate that crosslinking leads to brush collapse/volume contraction and therefore decreased ability to intercalate with surrounding material. In any event, both data sets are consistent with and support the given hypothesis.

Figure 12:
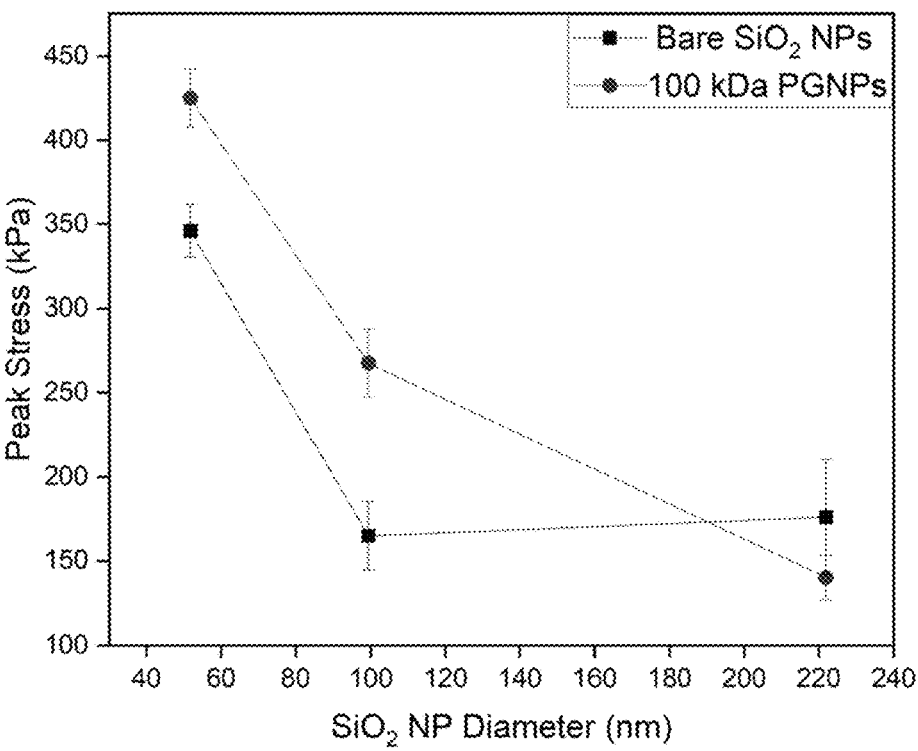
FIG. 12 shows, according to some embodiments, dynamic overlap shear data for PSA films containing bare $SiO_2$ and ~-100 kDa PGNPs with $SiO_2$ nanoparticles of varying size.

PSA mechanical testing with PGNPs of varying core size revealed that larger nanoparticle sizes resulted in decreased mechanical strength for all compositions, regardless of the presence of polymer grafts (FIG. 12). This was in agreement with the initial hypothesis that smaller nanoparticle cores would yield greater mechanical reinforcement from the resulting PGNPs, which can be attributed to the greater surface curvature of the smaller particles.

Thus, polymer grafts on larger nanoparticle cores sit at smaller normal angles relative to each other on the surface than equivalent length chains on smaller nanoparticle cores. The reduced surface curvature would therefore keep the brush in a sterically extended configuration, leading to the same type of brush collapse and loss of mechanical strength as for long-graft PGNPs. This does not, however, explain the decline in mechanical strength for bare $SiO_2$-filled PSAs. It is therefore hypothesized that surface area:volume ratio is an important factor as well, in that the mechanical benefit from interfacial slip resistance is offset by the decrease in viscoelasticity/flexural modulus brought on by the increased size of the nanoparticle fillers.

In conclusion, polymer-grafted nanoparticles have been shown to significantly enhance cohesive strength over control films, as measured by an up to 3-fold increase in hang time under static load and an up to 33% increase in shear resistance under dynamic load.

EXAMPLE 2

The following example describes the materials and methods employed to fabricate and evaluate the pressure-sensitive adhesives comprising polymer-grafted particles.

Materials: Unless otherwise noted, all reagents were used as received. Triethoxysilane (96%), tetraethoxysilane (99.9%), tris[2-(dimethylamino)ethyl]amine ($Me_6TREN$) (99+%), and tin(II) 2-ethylhexanoate (95%) were purchased from Alfa Aesar. Ethyl-α-bromoisobutyrate (EBiB) (98%), 5-hexen-1-ol (98%), acetylacetone (≥99%), Karstedt's catalyst (0.1 M in PDMS), and hydrofluoric acid (aqueous, 48-51 wt. %) were purchased from Sigma-Aldrich. The monomers n-butyl acrylate (nBA) (≥99%) and tert-butyl acrylate (tBA) (98%) were purchased from Sigma-Aldrich and were passed through a column of basic alumina to remove inhibitor prior to all polymerizations. Anhydrous copper(II) bromide (99+%) was purchased from Acros and stored as a stock solution in dimethylformamide (DMF) (20 mg/mL). 2-bromoisobutyryl bromide (>98%) was purchased from TCI America. Ammonium hydroxide (aqueous, 28-30 wt. %), triethylamine (99%), and trifluoroacetic acid (TFA) (>97%) were purchased from Thermo Fisher Scientific. The crosslinking agent aluminum(III) acetylacetonate ($Al(acac)_3$) (99%) was purchased from Sigma Aldrich and was stored as a stock solution in acetone (3 wt. %). All solvents were of analytical grade and were used as received. The adhesive elastomer blend (67 wt. % nBA, 30 wt. % 2-ethylhexyl acrylate, 3 wt. % AA) and tape backing material (etched PET film and release liner) were provided by tesa SE.

Figures 14A, 14B:
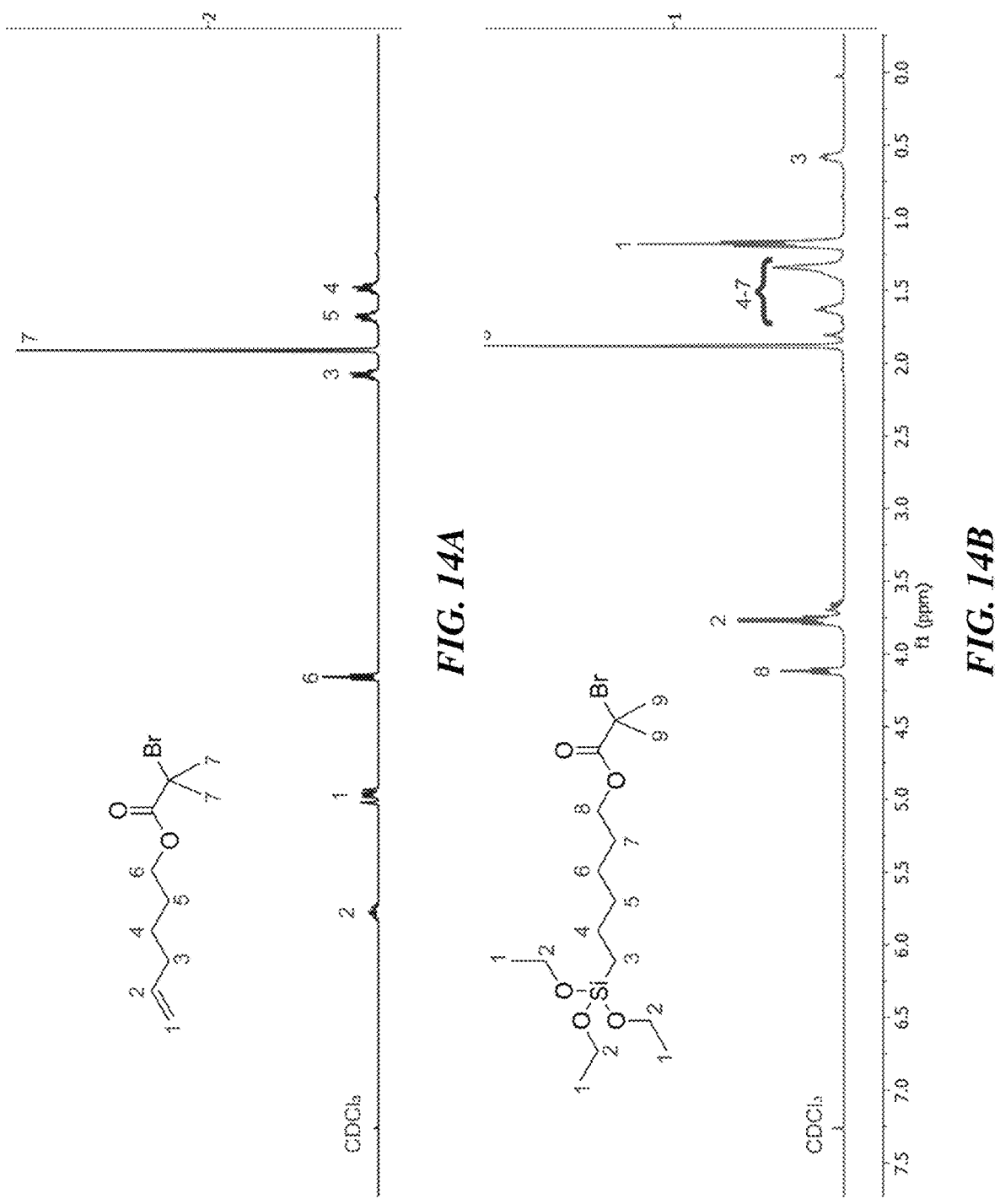
FIG. 14A shows, according to some embodiments, $^1$H-NMR spectra of intermediate BPH in $CDCl_3$.
FIG. 14B shows, according to some embodiments, $^1$H-NMR spectra of surface-tetherable initiator BHE in $CDCl_3$.

Synthesis of (2-Bromo-2-methyl)propionyloxyhexyltriethoxysilane (BHE) Surface-Tetherable ATRP Initiator: The synthesis of BHE was carried out in two separate steps. In the first step, 5-hexen-1-ol (25 g/0.25 mol), triethylamine (41.7 mL/0.30 mol), and anhydrous THF (500 mL) were added to an oven-dried, nitrogen-purged 1 L 3-neck round-bottom flask equipped with an addition funnel and oil bubbler. The contents of the flask were allowed to cool to 0° C. in an ice bath, at which point 2-bromoisobutyryl bromide (37 mL/0.30 mol) was added dropwise through the addition funnel. Under magnetic stirring, the mixture was allowed to come up to room temperature overnight. The flask contents were vacuum filtered to remove the triethylammonium bromide salt byproduct and residual THF and TEA were removed from the filtrate under reduced pressure. The resulting orange liquid was then diluted in 250 mL of chloroform and washed twice each with 250 mL of 1 M HCl, 250 mL of saturated $NaHCO_3$ solution, and 250 mL of deionized water. The organic phase was then dried over $MgSO_4$ and the solvent removed under reduced pressure. The product was then purified by silica gel chromatography (15:1 hexanes/ethyl acetate, Rf≈0.5) to give 1-(2-bromo-2-methyl)propionyloxy-5-hexene (BPH) as a colorless oil. $^1$H-NMR ($CDCl_3$): δ 1.47 and 1.68 (m, 4H, $CH_2$), 1.90 (s, 6H, $CCH_3$), 2.08 (q, 2H, $CH_2CHCH_2$), 4.16 (t, 2H, $CH_2O$), 4.93-5.04 (m, 2H, $CH_2CH$), 5.79 (m, 1H, $CH_2CH$). $^{13}$C NMR ($CDCl_3$): δ 25.2, 27.9, and 33.3 ($CH_2$), 30.9 ($CCH_3$), 56.0 (CBr), 66.0 ($CH_2O$), 115.0 ($CH_2CH$), 138.2 ($CH_2CH$), 171.8 (C=O). See FIG. 14A.

In the second step, BPH (38 g/0.152 mol) was added to a dry 1 L round-bottom flask along with triethoxysilane (250 g/1.52 mol) and anhydrous toluene (280 mL). After purging the mixture with nitrogen, Karstedt's catalyst (0.25 mL) was added and the reaction was allowed to proceed at room temperature under magnetic stirring. Reaction progress was monitored via $^1$H-NMR and additional catalyst was added in 0.25 mL increments as needed. Solvent was removed by rotary evaporation and excess triethoxysilane was removed by vacuum distillation (60° C./400 mTorr) to give the product, BHE, as a clear yellow oil which was kept in the dark until active use. $^1$H-NMR ($CDCl_3$): δ 0.58 (t, 2H, $SiCH_2$), 1.18 (t, 9H, $CH_3CH_2OSi$), 1.29-1.44 and 1.58-1.70 (br, 8H, $CH_2$), 1.88 (s, 6H, $CCH_3$), 3.77 (q, 6H, $CH_3CH_2OSi$), 4.12 (t, 2H, $CH_2O$). $^{13}$C NMR ($CDCl_3$): δ 10.4 ($SiCH_2$), 18.3 ($SiOCH_2CH_3$), 22.7, 25.5, 28.3, and 32.7 ($CH_2$), 30.8 ($CCH_3$), 56.0 (CBr), 58.3 ($SiOCH_2CH_3$), 66.2 ($CH_2O$), 171.7 (C=O). See FIG. 14B.

Figure 16:
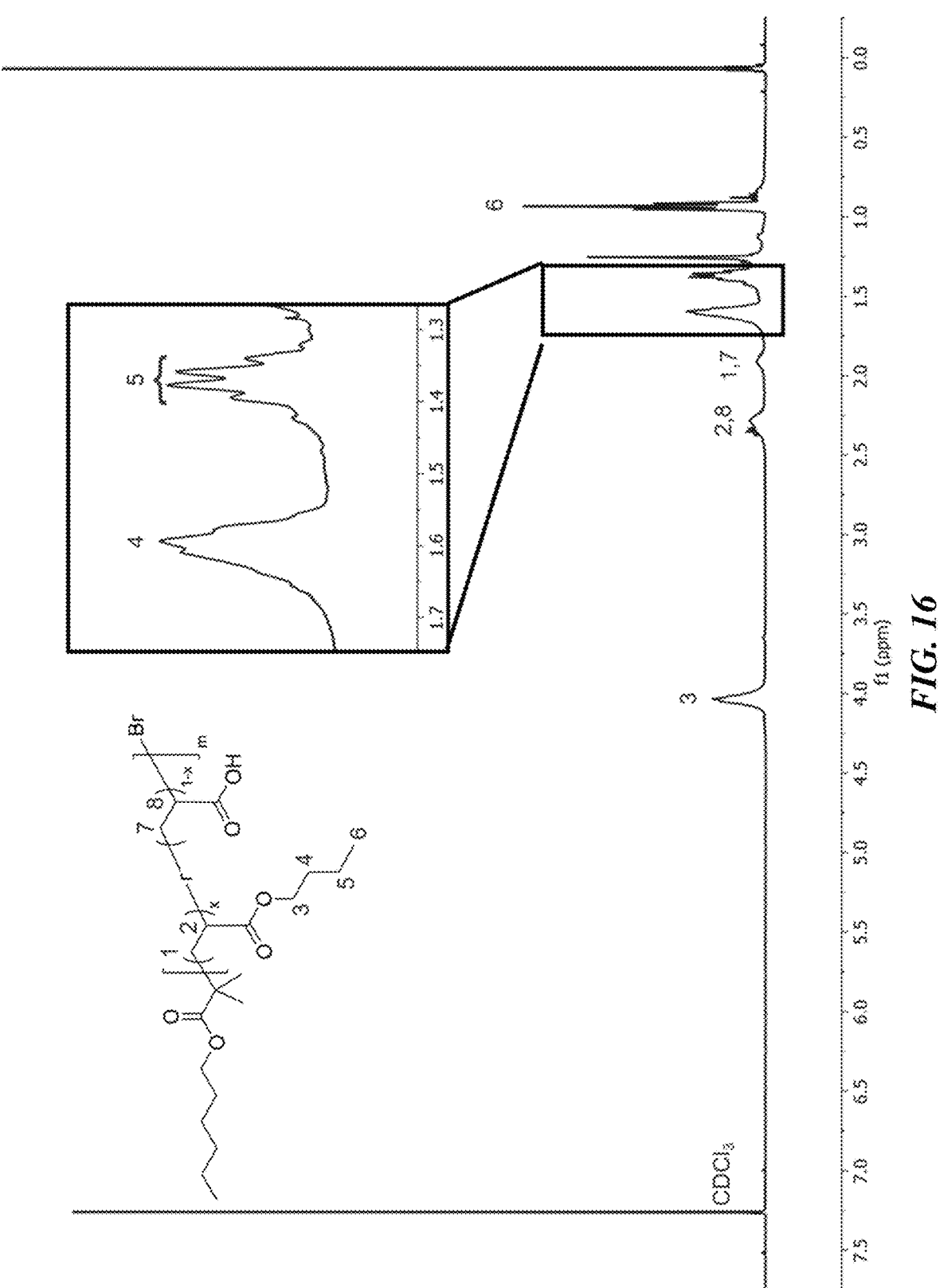
FIG. 16 shows, according to some embodiments, $^1$H-NMR spectra of degrafted poly(n-butyl acrylate-co-acrylic acid)
Figure 17A:
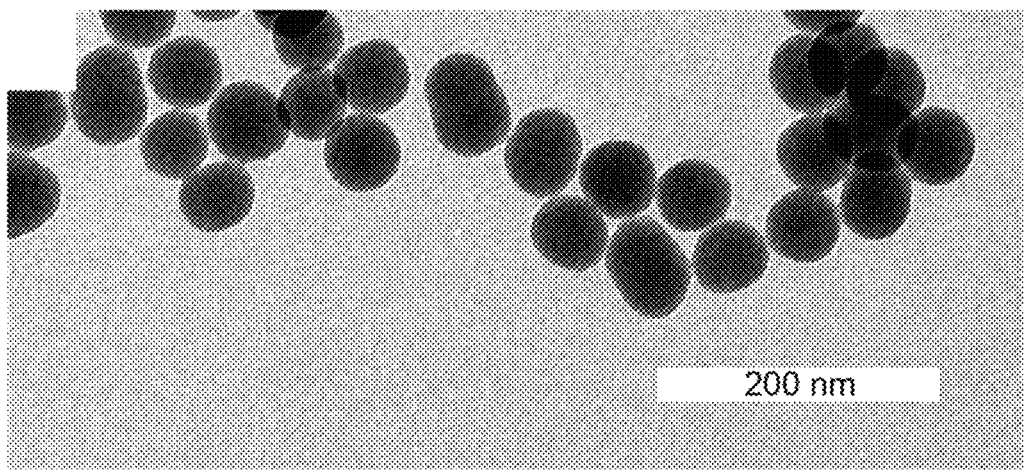
FIG. 17A shows, according to some embodiments, a transmission electronic microscopy (TEM) image of 51.8 nm $SiO_2$ nanoparticles.
Figure 17B:
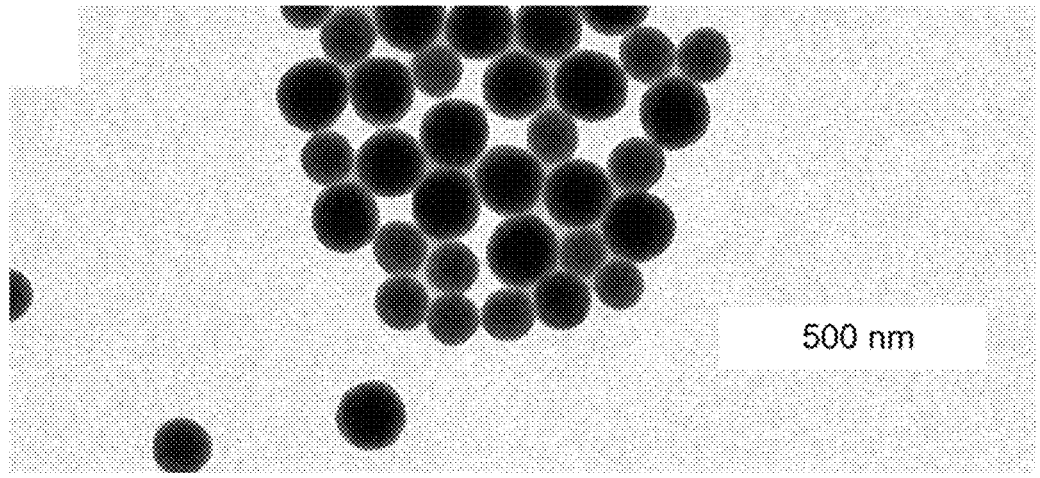
FIG. 17B shows, according to some embodiments, a TEM image of 99.1 nm $SiO_2$ nanoparticles.
Figure 17C:
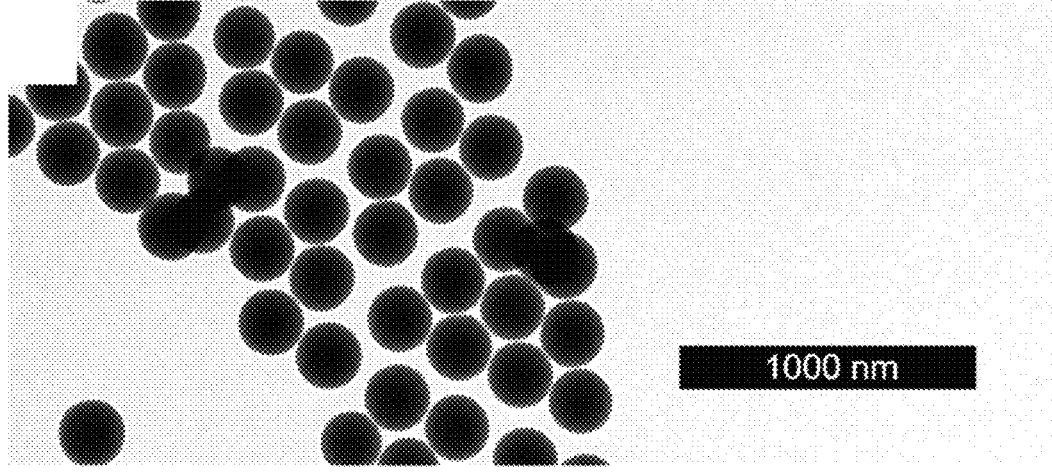
FIG. 17C shows, according to some embodiments, TEM images of 222 nm $SiO_2$ nanoparticles.

Synthesis of Silica Nanoparticles with Surface-Tethered ATRP Initiator:

Monodisperse $SiO_2$ nanoparticles were obtained via the Stoller process. For a typical reaction aimed at producing ~50 nm diameter particles, 200 proof ethanol (1325 mL), ammonia solution (28 wt. %, 81 mL), and nanopure water (36.7 mL) were added to an oven-dried 2 L RB flask with a magnetic stir bar. The solution was heated to 55° C. with a temperature-controlled heating mantle and allowed to equilibrate for 1 hour. Tetraethoxysilane (57 mL) was then added quickly under 400 rpm stirring, at which point the stirring was reduced to 150 rpm and the reaction was allowed to proceed for 3 hours. The temperature was then reduced to 40° C. and a 10-fold excess of BHE (~16 g) was added incrementally over a 24-hour period. The surface-functionalized silica nanoparticles were then recovered by centrifugation after three redispersions each in ethanol and anisole and were stored as a stock solution in anisole for future use. Mean particle diameters and standard deviations were obtained by ImageJ analysis of TEM images taken at MIT MRSEC. $SiO_2$ nanoparticles with diameters of ~50, ~100, and ~200 nm have been prepared by this method. See FIGS. 16A-16C.

Figure 5:
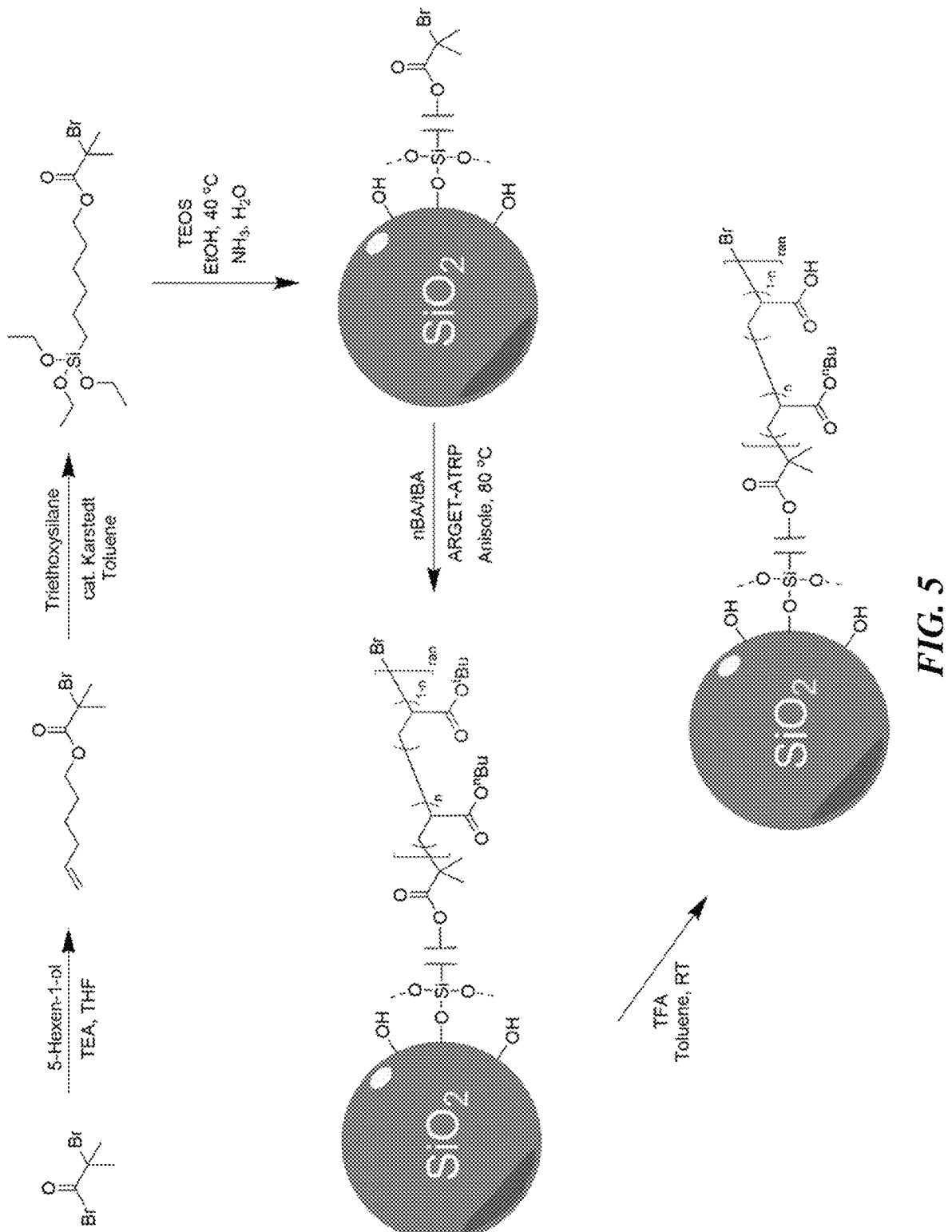
FIG. 5 shows, according to some embodiments, a synthetic scheme for the preparation of crosslinkable polymer-grafted nanoparticles (PGNPs)

Synthesis and Characterization of Crosslinkable Nanocomposite Brushes: The PGNP brushes used in this study were grown directly from the BHE-functionalized nanoparticle surfaces via surface-initiated atom transfer radical polymerization (SI-ATRP). Due to the known difficulty of polymerizing acidic monomers via ATRP, an indirect approach was taken involving copolymerization of nBA and tBA, followed by deprotection to yield AA-containing $SiO_2$-elastomer nanocomposite particles. This "grafting-from" approach allows for a high degree of both tunability and scalability, and gram-scale synthesis of nanomaterial was achieved with this method. A full synthetic scheme is shown in FIG. 5.

Figure 15:
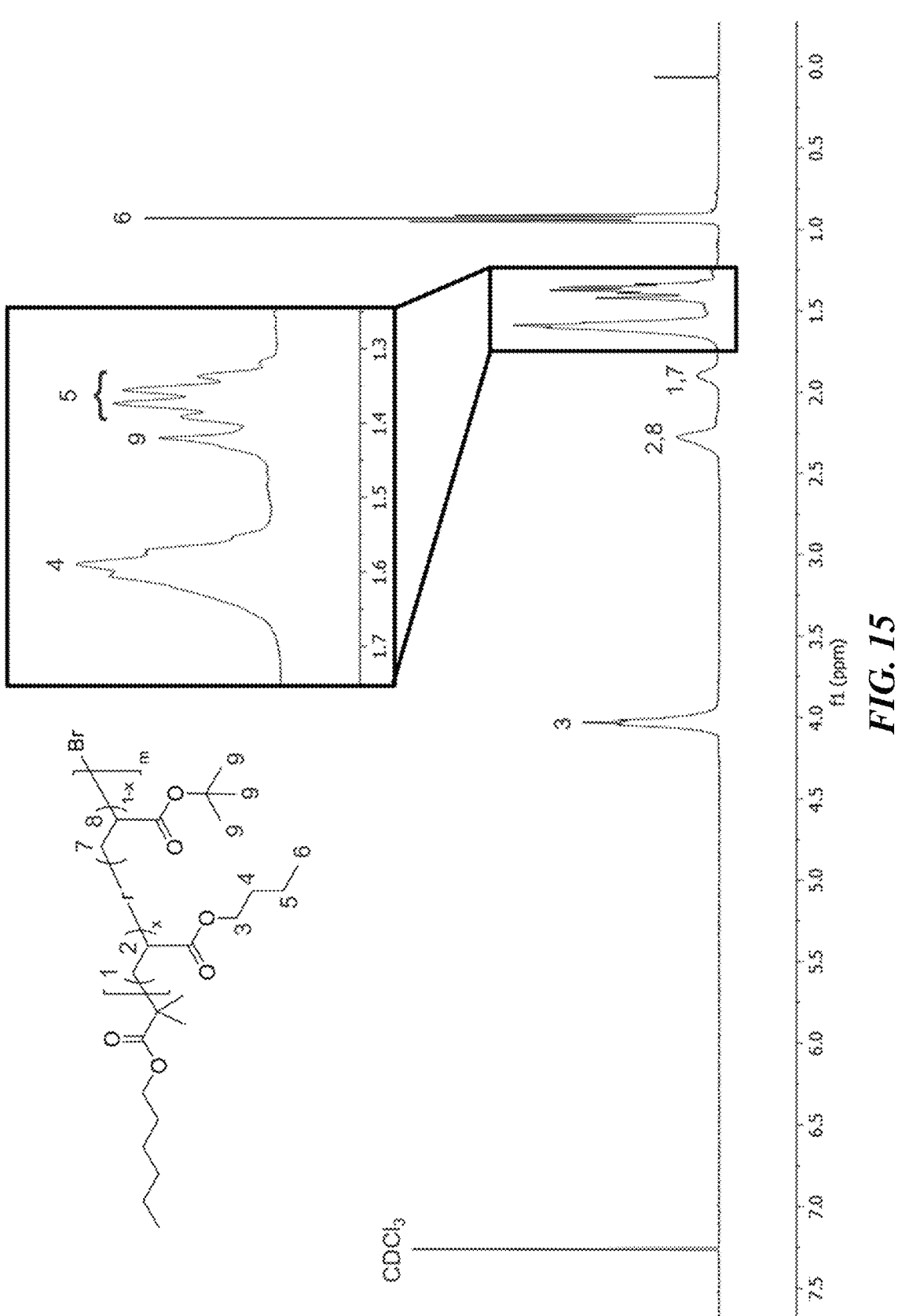
FIG. 15 shows, according to some embodiments, $^1$H-NMR spectra of degrafted poly(n-butyl acrylate-co-tert-butyl acrylate)

For preparation of a typical polymer brush batch, BHE-functionalized $SiO_2$ stock solution (4.0000 g/6.4×10⁻⁶ mol), $CuBr_2$ (0.568 m/2.54×10⁻⁶ mol), $Me_6TREN$ (3.4 µL/1.3× 10⁻⁵ mol), nBA (7.8 mL/5.4×10⁻² mol), tBA (0.45 mL/3.1× 10⁻³ mol), and anisole (12.55 mL) were added to an oven-dried 25 mL Schlenk flask equipped with a rare-earth stir bar. The reaction mixture was degassed by four cycles of freeze-pump-thaw followed by back-filling with nitrogen gas. A stock solution of tin(II) ethylhexanoate (15.44 mg/mL) in anisole was prepared and degassed by sparging with $N_2$ for 5 minutes. A 200 µL aliquot of this stock solution was then injected into the reaction mixture to activate the reaction (1:3 Cu:Sn) and the flask was immediately immersed in an 80° C. oil bath and allowed to proceed. Reaction progress was tracked via ¹H-NMR. Once the desired conversion had been reached the reaction was terminated by opening to air and adding oxygenated THF. The PGNPs were purified by three cycles of centrifugation/redispersion in THF, followed by precipitation in MeOH and drying under vacuum. The as-synthesized PGNP material was soft and tacky to the touch and bore strong resemblance to the bulk adhesive elastomer. Polymer chain molecular weight distribution was assessed with gel permeation chromatography (GPC), grafting density (a, chains nm⁻²) of polymer chains on the nanoparticle core surface was determined with thermogravimetric analysis (TGA), and copolymer composition was assessed with high-resolution ¹H-NMR. See FIG. 15.

To convert tBA units to AA, deprotection with ~-160 eq. TFA was carried out in toluene over 24 hours at room temperature. Deprotected PGNPs were recovered after 5 cycles of centrifugation/redispersion in THF and stored as a stock solution in THF for later use. Complete deprotection of all tert-butyl groups was confirmed by the disappearance of the respective 1.42 ppm peak in the ¹H-NMR spectra. See FIG. 16. PGNPs produced by this method are notably soft and tacky at ambient conditions, very similar to the PSA elastomer blend itself.

Synthesis of Free P(nBa-co-AA): Free polymer chains of the same monomer composition as the PGNPs were synthesized via ARGET-ATRP with similar methods as were used for PGNPs. For a typical free polymer synthesis, a ratio of EBiB:Cu(II):$Me_6TREN$:Sn(II):nBA:tBA of 1:0.35:1.75: 1.05:2292:121 along with an equal volume of anisole were added to a 100 mL Schlenk flask. Following the reaction, the polymer was purified by precipitation in to cold MeOH twixe, followed by removal of residual monomer under high vacuum at 160° C. Deprotection of tBA to AA took place in dichloromethane (DCM) with 160 eq of TFA at room temperature for 24 hours, at which point the solvent and acid were both removed under reduced pressure. The resulting polymer had a number-averaged molecular weight of $M_n$=110,897 g/mol by GPC and a composition of nBa:AA=0.943:0.057 by NMR.

Preparation of PSA Tape Samples: For a typical reference PSA film with a coating weight of ~-50 g m⁻², 2.0 g of tesa elastomer and 8.0 g of toluene were added to a 50 mL RB flask with a rare-earth magnetic stir bar. The mixture was heated to 45° C. and allowed to stir overnight until the elastomer was fully dissolved. $Al(acac)_3$ crosslinker (0.0-0.2 wt. % relative to dry elastomer) was then added and the mixture was left to stir an additional 2 hours until fully homogenous. The mixture was then poured out onto release liner and spread to a height of 300 microns with a doctor blade film applicator. The spread film was then placed in a drying oven preheated to 90° C. to remove solvent for 90 minutes. Dry films were then crosslinked at 120° C. for 20 minutes, after which point the oven was switched off and allowed to cool to room temperature. Etched PET backing material was then applied to the free side of the elastomer film to produce PSA tape reference samples. Double-sided PSA tape samples for dynamic shear testing were prepared by fixing elastomer to both sides of the PET backer.

Preparation of PGNP-PSA Tape Samples: Films of varying PGNP/tesa elastomer w/w ratios were prepared with a total dry weight of 2.0 g and a total solvent weight of 8.0 g using the same general procedure as for the reference films. $Al(acac)_3$ crosslinker concentration was measured out relative to total dry polymeric material (PGNP polymer grafts and free elastomer), not counting the $SiO_2$ cores. The concentration of PGNPs in the host matrix is given in a molar ratio of parts PGNPs per million parts free elastomer (ppm elastomer).

Static Shear Testing of PSA Tape Samples: PSA tape samples were cut into 6.35 mm wide strips with a double-bladed precision sample cutter and fixed to pre-cleaned stainless steel testing plates. A 2.0 kg steel roller was run back and forth along each tape sample to ensure even contact with the test plate surface. The free ends of the tape strips were then secured to metal fasteners. The samples were then hung from the test-plate end on force-sensitive timers affixed to the wall of the laboratory, and 500 g steel weights were then hung shock-free from the fastener ends of the tape samples. The samples were then left to cohesively fail under static shear of gravity; upon failure of the sample, the weight would drop free of the test plate, and the timer would stop. Tape samples were tested in triplicate and the median time to failure used as a benchmark for comparing cohesive strength between PSA formulations.

Peel Adhesion Testing of PSA Tape Samples: Peel adhesion testing was carried out with an Imada MX-110 motorized test stand equipped with a 180° peel testing fixtures according to ASTM D3330 (method B). Precision specimen cutters were used to cut single-sided PSA tape specimens to uniform width. The specimens were fixed at one end to a motorized actuator/force sensor via film grip attachment, and at the other end to a stainless-steel stage with a weighted steel roller. Specimens were peeled from the test plate at constant, standardized crosshead speed and the data collected as a force over displacement curve with Imada software. The average of each curve was used to calculate average peel adhesion strength and adhesion energy for each tape composition.

Dynamic Shear Testing of PSA Tape Samples: A square 18×18 mm steel punch was used to cut specimens from double-sided PSA samples. The specimens were sandwiched between stainless steel test plates and fixed with a screw press under 100 N/cm² of pressure for four minutes. Bonded specimens were fixed at one end to the base of the tensile tester, with the free end held by the motorized actuator/force sensor. The specimens were then subjected to shear stress until failure at a constant crosshead speed of 10 mm/min. Force over displacement data curves were collected with Imada software. A minimum of 10 replicate measurements were taken for each PSA composition to account for variances between individual specimens. Values of mean peak shear stress and associated 99% confidence interval are shown for a variety of compositions.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A composition comprising:
a pressure-sensitive adhesive comprising polymer-grafted particles and one or more base polymer components,
wherein the polymer-grafted particles are selected in conjunction with the pressure-sensitive adhesive such that the polymer-grafted particles are capable of interacting with at least one component of the pressure-sensitive adhesive, resulting in an increase in cohesive strength of the pressure-sensitive adhesive without a loss of adhesive strength as compared to an essentially identical composition that is otherwise equivalent but does not include the polymer-grafted particles under essentially identical conditions, and
wherein at least two polymer chains of the polymer-grafted particles are non-covalently bound to the one or more base polymer components.

2. The composition of claim 1, wherein the polymer-grafted particles comprise particles having one or more surfaces to which polymer chains are grafted.

3. The composition of claim 1, wherein the pressure-sensitive adhesive comprises a crosslinking agent.

4. The composition of claim 1, wherein at least one polymer chain of the polymer-grafted particles is ionically bound to the one or more base polymer components of the pressure-sensitive adhesive.

5. The composition of claim 1, wherein at least one polymer chain of the polymer-grafted particles is covalently bound to the one or more base polymer components of the pressure-sensitive adhesive.

6. The composition of claim 3, wherein at least one polymer chain of the polymer-grafted particles is bound to the one or more base polymer components of the pressure-sensitive adhesive via crosslinking of the crosslinking agent.

7. The composition of claim 6, wherein the at least one polymer chain of the polymer-grafted particles is bound to the one or more base polymer components of the pressure-sensitive adhesive via covalent crosslinking of the crosslinking agent.

8. The composition of claim 6, wherein the at least one polymer chain of the polymer-grafted particles is bound to the one or more base polymer components of the pressure-sensitive adhesive via non-covalent crosslinking of the crosslinking agent.

9. The composition of claim 1, wherein the pressure-sensitive adhesive comprises the polymer-grafted particles in an amount between greater than or equal to 0.01 wt. % and less than or equal to 25 wt. % versus the total weight of the pressure-sensitive adhesive.

10. A composition of claim 1, comprising:
a pressure-sensitive adhesive comprising polymer-grafted particles,
wherein the polymer-grafted particles are selected in conjunction with the pressure-sensitive adhesive such that the polymer-grafted particles are capable of interacting with at least one component of the pressure-sensitive adhesive, resulting in an increase in cohesive strength of the pressure-sensitive adhesive without a loss of adhesive strength as compared to an essentially identical composition that is otherwise equivalent but does not include the polymer-grafted particles under essentially identical conditions, and
wherein the composition has a glass transition temperature between greater than or equal to −50 degrees Celsius and less than or equal to 100 degrees Celsius.

11. An article, comprising:
one or more substrates; and
the composition as recited in claim 1.

12. An article of claim 11, comprising:
one or more substrates; and
a pressure-sensitive adhesive comprising polymer-grafted particles,
wherein the polymer-grafted particles are selected in conjunction with the pressure-sensitive adhesive such that the polymer-grafted particles are capable of interacting with at least one component of the pressure-sensitive adhesive, resulting in an increase in cohesive strength of the pressure-sensitive adhesive without a loss of adhesive strength as compared to an essentially identical composition that is otherwise equivalent but does not include the polymer-grafted particles under essentially identical conditions,
wherein an adhesion strength of the pressure-sensitive adhesive is between greater than or equal to 80% and less than or equal to 120% of an adhesion strength of an essentially identical pressure-sensitive adhesive that is otherwise equivalent but does not include the polymer-grafted particles under essentially identical conditions.

13. The article of claim 12, wherein the adhesion strength of the pressure-sensitive adhesive is between greater than or equal to 2 N/cm and less than or equal to 3 N/cm.

14. An article, comprising:
one or more substrates; and
a pressure-sensitive adhesive comprising polymer-grafted particles,
wherein the polymer-grafted particles are selected in conjunction with the pressure-sensitive adhesive such that the polymer-grafted particles are capable of interacting with at least one component of the pressure-sensitive adhesive, resulting in an increase in cohesive strength of the pressure-sensitive adhesive without a loss of adhesive strength as compared to an essentially identical composition that is otherwise equivalent but does not include the polymer-grafted particles under essentially identical conditions,
wherein a dynamic overlap shear strength of the pressure-sensitive adhesive is between greater than or equal to 110% and less than or equal to 150% of a dynamic overlap shear strength of an essentially identical pressure-sensitive adhesive that is otherwise equivalent but does not include the polymer-grafted particles under essentially identical conditions.

15. The article of claim 14, wherein the dynamic overlap shear strength of the pressure-sensitive adhesive is between greater than or equal to 75 kPa and less than or equal to 450 kPa.

16. An article, comprising:
one or more substrates; and
a pressure-sensitive adhesive comprising polymer-grafted particles,
wherein the polymer-grafted particles are selected in conjunction with the pressure-sensitive adhesive such that the polymer-grafted particles are capable of interacting with at least one component of the pressure-sensitive adhesive, resulting in an increase in cohesive strength of the pressure-sensitive adhesive without a loss of adhesive strength as compared to an essentially identical composition that is otherwise equivalent but does not include the polymer-grafted particles under essentially identical conditions,
wherein an adhesion time of the pressure-sensitive adhesive prior to failure under a static load is between greater than or equal to 1.2 times and less than or equal to 4 times greater than an adhesion time of an essentially identical pressure-sensitive adhesive that is otherwise equivalent but does not include the polymer-grafted particles under essentially identical conditions.

* * * * *